(12) United States Patent
Mashimo et al.

(10) Patent No.: US 8,419,538 B2
(45) Date of Patent: Apr. 16, 2013

(54) STORAGE MEDIUM STORING GAME PROGRAM, GAME APPARATUS AND GAME CONTROL METHOD

(75) Inventors: Masahiko Mashimo, Kyoto (JP); Shinya Saito, Kyoto (JP); Keiichi Yano, Tokyo (JP); Norihide Okada, Tokyo (JP)

(73) Assignee: Nintendo Co., Ltd., Kyoto (JP)

(*) Notice: Subject to any disclaimer, the term of this patent is extended or adjusted under 35 U.S.C. 154(b) by 1270 days.

(21) Appl. No.: 11/416,257

(22) Filed: May 3, 2006

(65) Prior Publication Data
US 2006/0287088 A1 Dec. 21, 2006

(30) Foreign Application Priority Data
Jun. 7, 2005 (JP) ................. 2005-166391

(51) Int. Cl.
- *A63F 9/24* (2006.01)
- *A63F 13/00* (2006.01)
- *G06F 17/00* (2006.01)
- *G06F 19/00* (2011.01)

(52) U.S. Cl.
USPC .......... 463/37; 463/7; 463/8; 463/30; 463/36; 463/40; 345/173; 273/148 R; 434/128; 434/250

(58) Field of Classification Search .............. 463/37, 463/7, 9, 25, 30, 36, 38
See application file for complete search history.

(56) References Cited

U.S. PATENT DOCUMENTS

| | | | | |
|---|---|---|---|---|
| 4,285,517 A | * | 8/1981 | Morrison | 463/9 |
| 4,720,789 A | * | 1/1988 | Hector et al. | 463/33 |
| 5,186,471 A | * | 2/1993 | Vancraeynest | 463/41 |
| 6,116,908 A | * | 9/2000 | Takai | 434/250 |
| 6,227,968 B1 | * | 5/2001 | Suzuki et al. | 463/7 |
| 6,347,998 B1 | * | 2/2002 | Yoshitomi et al. | 463/42 |

(Continued)

FOREIGN PATENT DOCUMENTS

| | | |
|---|---|---|
| JP | 62-32988 | 2/1987 |
| JP | 11-151380 | 6/1999 |

(Continued)

OTHER PUBLICATIONS

Dance Dance Revolution Disney Mix by Konami as referenced by the Wikipedia article for Dance Dance Revolution <http://en.wikipedia.org/wiki/Dance_dance_revolution> and the Wikipedia article for Dance Dance Revolution Disney Mix showing the release date of Sep. 18, 2001 <http://en.wikipedia.org/wiki/Dance_Dance_Revolution_Disney_Mix>.*

(Continued)

*Primary Examiner* — Paul A D'Agostino
(74) *Attorney, Agent, or Firm* — Nixon & Vanderhye P.C.

(57) ABSTRACT

A game apparatus includes an LCD, and a game screen is displayed on the LCD. A touch panel is provided on the LCD. The game screen presents a marker image so as to be variable in position in time with performance of music, and also presents a timer circle image for indicating touch timing for the marker image. A player needs to touch a marker image to be touched with precise timing, listening to the music or watching the timer circle image. The player's touch is evaluated on the basis of the touch timing and the touch position. If the touch is evaluated as a failure, the game screen is shaken.

28 Claims, 18 Drawing Sheets

U.S. PATENT DOCUMENTS

| | | | |
|---|---|---|---|
| 6,379,244 B1* | 4/2002 | Sagawa et al. | 463/7 |
| 6,450,888 B1* | 9/2002 | Takase et al. | 463/43 |
| 6,482,087 B1* | 11/2002 | Egozy et al. | 463/7 |
| 6,582,309 B2* | 6/2003 | Higurashi et al. | 463/31 |
| 6,607,446 B1* | 8/2003 | Shimomura et al. | 463/43 |
| 6,638,160 B2* | 10/2003 | Yoshitomi | 463/7 |
| 6,659,873 B1* | 12/2003 | Kitano et al. | 463/42 |
| 6,769,986 B2* | 8/2004 | Vancura | 463/30 |
| 6,786,821 B2* | 9/2004 | Nobe et al. | 463/31 |
| 6,869,363 B2* | 3/2005 | Okitsu et al. | 463/29 |
| 6,905,413 B1* | 6/2005 | Terao et al. | 463/40 |
| 6,913,536 B2* | 7/2005 | Tomizawa et al. | 463/43 |
| 7,128,649 B2* | 10/2006 | Nobe et al. | 463/23 |
| 7,223,174 B2* | 5/2007 | Machida | 463/43 |
| 7,249,950 B2* | 7/2007 | Freeman et al. | 434/155 |
| 7,309,288 B2* | 12/2007 | Machida | 463/43 |
| 7,331,856 B1* | 2/2008 | Nakamura et al. | 463/7 |
| 7,331,868 B2* | 2/2008 | Beaulieu et al. | 463/30 |
| 7,485,042 B2* | 2/2009 | Nakatsuka et al. | 463/42 |
| 2002/0034980 A1* | 3/2002 | Lemmons et al. | 463/40 |
| 2002/0138853 A1* | 9/2002 | Chuuma et al. | 725/141 |
| 2002/0187837 A1* | 12/2002 | Hasebe et al. | 463/43 |
| 2003/0236111 A1* | 12/2003 | Otani et al. | 463/8 |
| 2005/0024343 A1* | 2/2005 | Collins | 345/173 |
| 2005/0208993 A1* | 9/2005 | Yoshizawa et al. | 463/20 |
| 2005/0264472 A1* | 12/2005 | Rast | 345/30 |
| 2008/0192300 A1* | 8/2008 | Kenji | 358/3.29 |

FOREIGN PATENT DOCUMENTS

| | | |
|---|---|---|
| JP | 2001-145783 | 5/2001 |
| JP | 2001-269482 | 10/2001 |
| JP | 2001-321564 | 11/2001 |
| JP | 2004-73682 | 3/2004 |
| JP | 3566195 | 6/2004 |
| JP | 2004-195023 | 7/2004 |
| WO | WO 00/49579 | 8/2000 |

OTHER PUBLICATIONS

MissionRed.com website home page from UPSTO archives (Wayback Machine), Apr. 1, 2001.*

MissionRed.com reflex game (Launch date: Apr. 1, 2001).*

IGN.com "Game Boy: E3 204 The Nintendo DS Revealed", 3 pages, record on http://web.archive.org/web/20050407225526 (2005).* http://www.gametrailers.com/video/japanese-trailer-ouendan/6813, 4 pages, posted Jul. 14, 2005.*

Nintendo Dream on www://web.archive.org/web/20050703021612/http://www.nindori.com/, 5 pages (2005).*

Arcadia magazine article, 4 pages, (2002).*

Nintendo Dream on www://web.archive.org/web/20060425160244/www.nindori.com/books/backnumber/140.ht, 2 pages (2006).*

Nintendo Dream on www://web.archive.org/web/20060425160147/www.nindori.com/books/backnumber/137.ht, 2 pages (2006).*

Nintendo Dream on www://web.archive.org/web/20060425160214/www.nindori.com/books/backnumber/139.ht, 2 pages (2006).*

NintendoDS Instruction booklet, Nintendo of America, Inc., 15 pages, (2005).*

Japanese translation Dengeki Game Cube magazine 7 pages Jul. 2005.*

Japanese translation Technic beat magazine 11 pages vol. 5, Issue 24 (2002).*

Japanese translation Nintendo Dream magazine 7 pages vol. 135, Issue Jul. 2005.* dengeki magazine, Media Works, Inc. 4 pages 2005.*

Nintendo Dream on www://web.archive.org/web/20060425160123/www.nindori.com/books/backnumber/138.ht, 2 pages (2006).*

Notice of Grounds of Rejection mailed Nov. 4, 2008 in corresponding Japanese Appln. No. 2007-026216 with partial English translation.

Arcadia May, "Technique Beat", Enterbrain Inc., vol. 3, No. 5 through No. 24, pp. 26-27, May 1, 2002.

"Professional Baseball Spirits 2004" "Dengeki Play Station," ASII Media Works, Inc., vol. 266, pp. 198-199, May 12, 2004.

Weekly Famitsu, "Cheerleaders (Provisionally)," published by Enterbrain, Inc., No. 858, May 27, 2005, 4 pages, with partial English translation.

Dengeki Gamecube, "Ossu! Fight! Cheerleaders!," published by MediaWorks, Inc., Jul. 1, 2005, 4 pages, with partial English translation.

Famitsu Cube + Advance, "Ossu! Fight! Cheerleaders!", published by Enterbrain, Inc., No. 73, Jul. 1, 2005, 4 pages, with partial English translation.

Nintendo Dream, "Succession of New Eleven DS Games, Ossu! Fight! Cheerleaders!," published by Mainichi Communications, Inc., vol. 135, Jul. 1, 2005, 4 pages, with partial English translation.

"Technic Beat", Arcadia—Coin Op Ed Videogame Magazine, No. 24, May 5, 2004, 6 pages.

* cited by examiner

FIG. 3
(A)
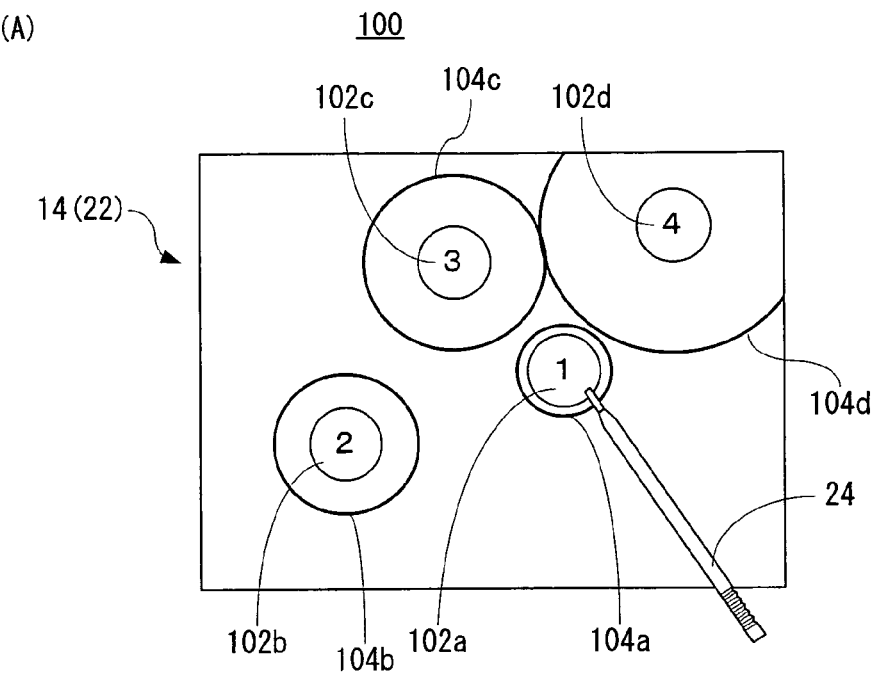
(B)
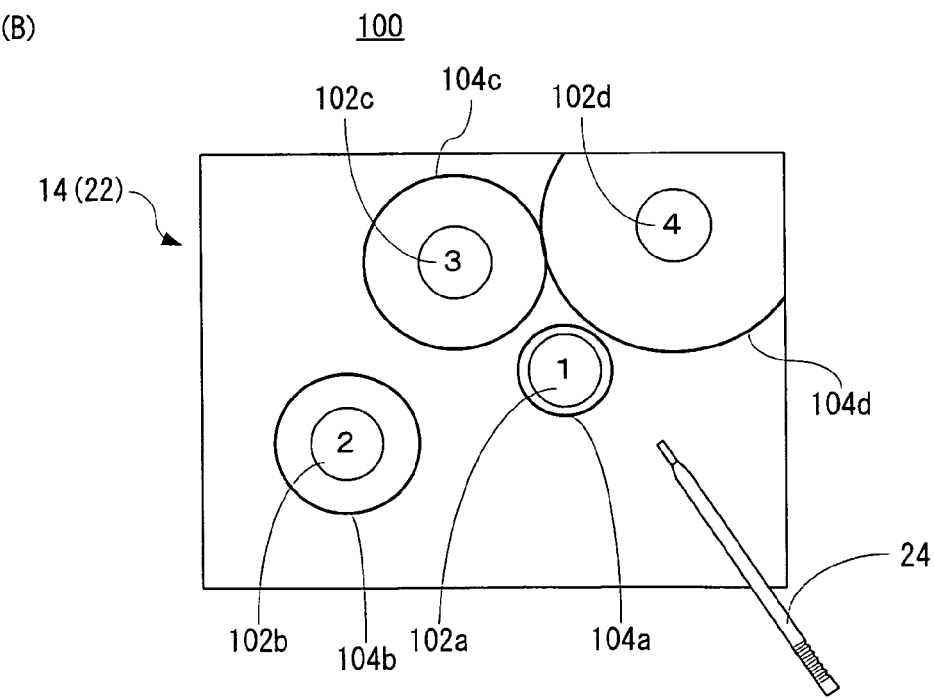

FIG. 4
(A) DISPLAY AREA OF MARKER IMAGES
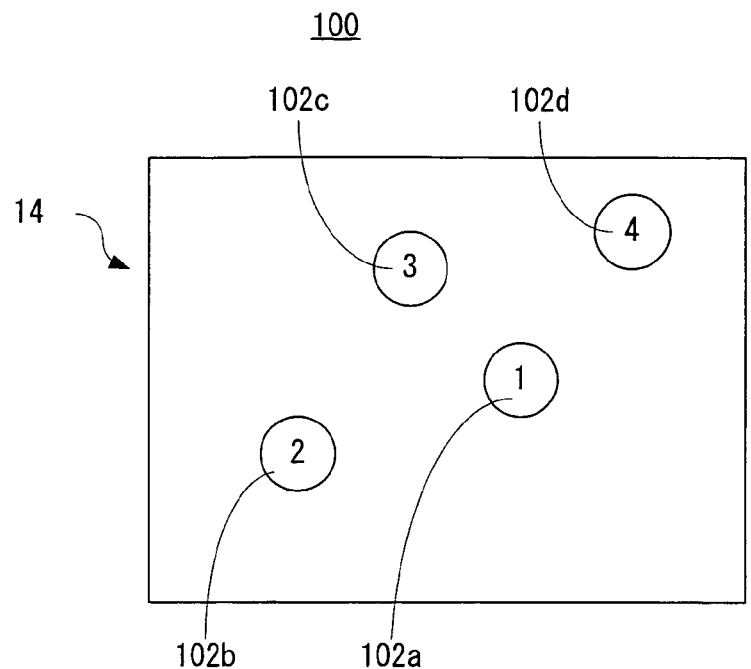
(B) TOUCH AREA
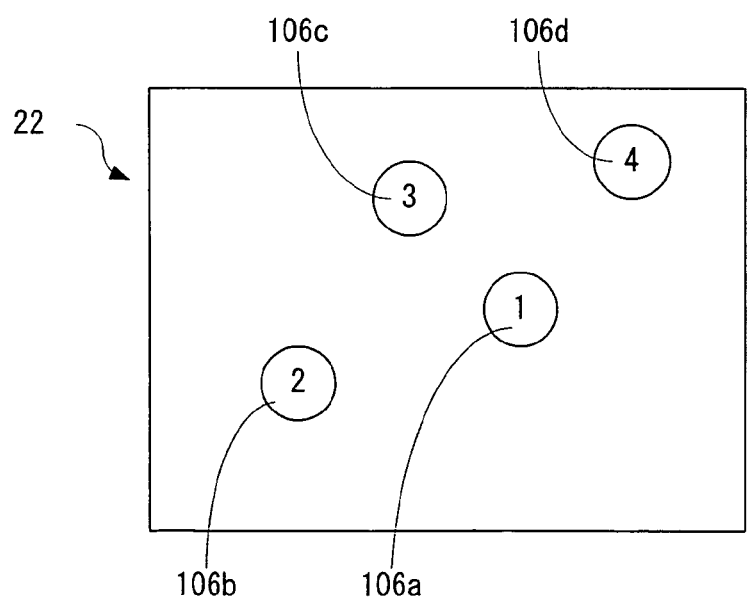

FIG. 12
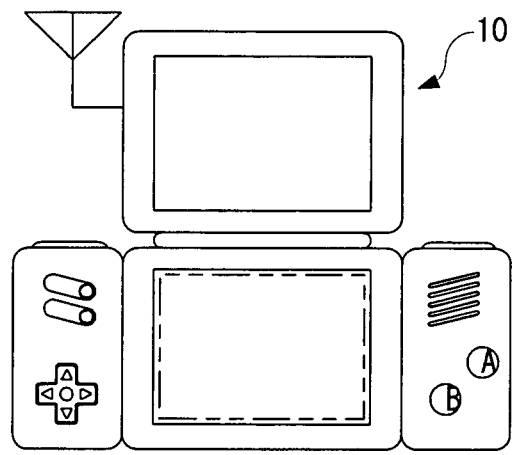
PARENT DEVICE
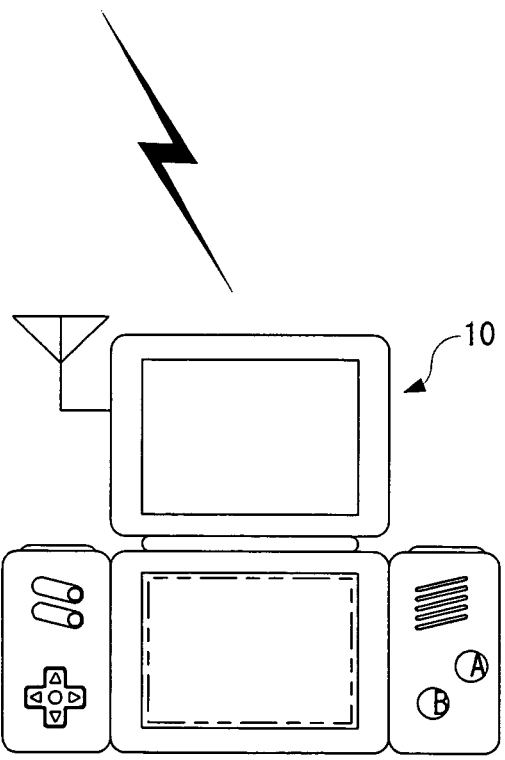
CHILD DEVICE

FIG. 15

EVALUATION RECORD

| NUMBER OF EVALUATIONS | RESULT | DIFFERENCE IN TOUCH TIMING (NUMBER OF FRAMES) | DIFFERENCE IN TOUCH POSITION (NUMBER OF DOTS) |
|---|---|---|---|
| 1 | SUCCESS | 5 | 5 |
| 2 | FAILURE | 10 | 40 |
| 3 | FAILURE | 25 | — |
| 4 | SUCCESS | 3 | 10 |
| 5 | SUCCESS | 0 | 8 |
| 6 | SUCCESS | 2 | 15 |
| 7 | SUCCESS | 10 | 10 |
| 8 | FAILURE | 20 | — |
| ⋮ | ⋮ | ⋮ | ⋮ |

STORAGE MEDIUM STORING GAME PROGRAM, GAME APPARATUS AND GAME CONTROL METHOD

CROSS REFERENCE OF RELATED APPLICATION

The disclosure of Japanese Patent Application No. 2005-166391 is incorporated herein by reference.

BACKGROUND

1. Field of the Technology

The technology presented herein relates to a storage medium a storing game program, a game apparatus and a game control method. More specifically, the technology relates to a storage medium storing a game program, a game apparatus and a game control method, whereby a game is played through touch operations.

2. Description of the Related Art

One example of this kind of game apparatus is disclosed in Japanese Patent Laying-open No. 11-151380 laid-open on Jun. 8, 1999 [A63F 9/22, G09B 15/00, G10H 1/00] (document 1). According to the music-enhancing game machine of document 1, a plurality of enhancing operation members are provided, the player is visually instructed to carry out an enhancing operation in time to music, an enhancing effect is output from the speaker according to the player's enhancing operation.

Also, another example of this kind of game apparatus is disclosed in Japanese Patent No. 3566195 [A63F 13/00] (document 2) issued on Sep. 15, 2004. According to document 2, a reference arrow mark is displayed on the upper part of the screen, and a plurality of timing guide marks moving from the lower part to the upper part of the screen are displayed in time to music. The player steps on the button input area to be operated in exact timing with the instant when a timing guide mark overlaps the reference arrow mark. The player can make a higher score if there is a higher degree of coincidence of the display time of timing guide mark and the player's timing of operation. For a match-up game, the number of timing guide marks on the other player's screen is increased in order to raise the difficulty level of gameplay for the other player.

Furthermore, still another example of this kind of game apparatus is disclosed in Japanese Patent Laying-open No. 2004-73682 laid-open on Mar. 11, 2004 [A63F 13/00, A63F 13/10] (document 3). According to document 3, each of players of a match-up game uses a touch panel to select an action (technique) to be used by his/her character for make an attack and the character's target of action, within the time limit for input. Then, after a lapse of the input time limit, an attack with the selected technique is launched toward the action target.

In the related arts of document 1 and document 2, however, the player merely performs an operation with timing. Additionally, the enhancing operation members and the button input area are fixedly arranged. They make game operations monotonous. Thus, the player may lose interest in playing the game when he/she has reached a certain level of gameplay.

Moreover, in the related art of document 2, an increased number of the timing guide arrow marks are displayed on the other player's screen for a match-up game, but this merely allows the player to carry out an increased number of game operations and cannot avoid the monotony of game operations, as in the case with the above mentioned art.

Furthermore, in the related art of document 3, the action and the action target need to be specified through the touch panel within the time limit, but no consideration is given to the timing of operation. Also, the action target must be specified by the player under his/her strategies etc. It is thus not determined whether the specified action target is correct or not. That is, the game is just played through the performance of touch operations instead of the use of operating switches, and thus this related art does not provide a game taking advantage of touch panel-specific operations.

SUMMARY

Therefore, it is a feature of the example embodiment presented herein to provide a novel storage medium storing game program, game apparatus and game control method.

It is another feature of the example embodiment to provide a storage medium storing game program, a game apparatus and a game control method which allow a player to feel a new sense of game operations.

The example embodiment employs a structure described below in order to resolve the above mentioned problems. Reference numerals and supplementary explanations in parenthesis show just examples of correspondence with the embodiments described later for facilitating the understanding of the present invention, and they impose no limitations to the example embodiment.

A storage medium storing a game program according to an example embodiment stores a game program for a game apparatus equipped with a display means and a touch panel provided in relation to the display means. This game program allows a processor of the game apparatus to execute a touch input detection step, a touch timing control step, a touch image display step, a touch timing detection step, a timing coincidence degree detection step, a touch position detection step, and a touch evaluation step. In the touch input detection step, a touch input is detected. In the touch timing control step, a first timing with which the touch input is to be performed is processed. In the touch image display step, a touch image to be touched by a player is generated and displayed on the display means. In the touch timing detection step, a second timing for the touch input detected in the touch input detection step is detected. In the timing coincidence degree detection step, a degree of coincidence of the first timing and the second timing is detected. In the touch position detection step, it is detected whether or not the touch position indicated by the touch input represents a position to touch. In the touch evaluation step, the touch input is evaluated according to result of detection in the timing coincidence degree detection step and result of detection in the touch position detection step.

More specifically, the game apparatus (10) is equipped with the display means (14) and the touch panel (22) provided in relation to the display means. The game program is executed by the processor (42) of the game apparatus (10). In the touch input detection step (42, S23, S141), a touch input to the touch panel (22) is detected. In the touch timing control step (42, a routine of S9 to S45, a routine of S127 to S173), the first timing with which the touch input is to be performed is processed. In the touch image display step (42, S43, S171), the touch image (102) to be touched by the player is generated and displayed on the display means (14). In the touch timing detection step (42), the second timing for the touch input detected in the touch input detection step (42, S23, S141) is detected. In the timing coincidence degree detection step (42, S51), the degree of coincidence (a difference in the embodiments) of the first timing and the second timing is detected. In the touch position detection step (42, S31, S149), it is detected whether or not the touch position indicated by the touch input represents a position to touch. In the touch evaluation step (42, S25, S33, S143, S151), the touch input is evaluated according to result of detection in the timing coincidence degree detection step (42, S51) and result of detection in the touch position detection step (42, S31, S149). That is, it is determined whether the touch has been given or not in the position to touch with the timing to touch.

According to the example embodiment, the touch is evaluated according to not only the touch timing but also the touch position, which makes it possible to perform unprecedented game operations. That is, the player can feel a new sense of game operations. In addition, the variety of the game can be increased because the game is not played just by setting the timing.

In one embodiment, the position to touch includes a position set in the touch panel in relation to the touch image. More specifically, the touch position to touch (106) includes a position set in the touch panel in relation to the touch image. For example, all the areas corresponding to the display areas of the touch images may be set as positions to touch. As above, the position to touch is set in relation to the touch image, it is easy to make sure that the touch image is touched or not by determining whether the position to touch is touched or not.

In another embodiment, in the touch image display step, the first timing is visibly displayed in relation to the touch image. More specifically, in the touch image display step (42, S43, S171), the first timing is visibly displayed in relation to the touch image (102). In this embodiment, a ring-shaped image (a timer circle image 104) surrounding the touch image (102) is displayed in such a manner that its size becomes gradually smaller and then same as a size of an outer periphery (edge) of the touch image (102) with the first timing. That is, since the first timing is visible, it is easy to set the touch timing.

In an aspect of the example embodiment, the game program further allows execution of a touch image display change step of changing display of the touch image, at least according to evaluation in the touch evaluation step. More specifically, in the touch image display change step (42, S83, S85, S87), display of the touch image (102) is changed at least according to evaluation in the touch evaluation step (42, S25, S33, S143, S151), for example, depending on whether the touch is successful or not. Thus, it is possible to know at least the success or failure of the touch from a change in the touch image.

In an embodiment, in the touch image display change step, a display position of the touch image is changed. For example, in the touch image display change step (42, S83, S85, S87), the display position of the touch image (102) is changed. For example, the display position of the touch image (102) is changed (vibrated) by shaking the whole game screen (100). As described above, the evaluation of the touch can be known from a change in the display position of the touch image.

In another embodiment, in the touch image display change step, a size of the touch image is changed. More specifically, in the touch image display change step (42, S83, S85, S87), the size of the touch image (102) is changed. For example, if the touch is successful, the touch image (102) is displayed in a larger size. On the contrary, if the touch is failed, the touch image (102) is displayed in a smaller size. Alternatively, the touch image (102) may be displayed in a smaller size in the case of the successful touch, whereas the touch image (102) may be displayed in a larger size in the case of the failed touch. As above, the success or failure of the touch can be known from the size of the touch image.

In another aspect of the example embodiment, the game program further allows execution of a communication step of carrying out data communications with another game apparatus. In the communication step, when a match-up game is played with a player of the other game apparatus, attack data according to evaluation in the touch evaluation step is transmitted to the other game apparatus. More specifically, in the communication step (32, 42, 64, S165), data communications with another game apparatus (10) is carried out. In the communication step (32, 42, 64, S165), when a match-up game is played with a player of the other game apparatus (10), the attack data according to evaluation in the touch evaluation step (42, S143, S151) is transmitted to the other game apparatus (10). As stated above, it is possible to make an attack against the opponent according to the touch evaluation, which allows the player to enjoy the game in an attempt to improve his/her touch operation. That is, this makes it possible to prevent the player from losing interest in playing the game as much as possible.

In an embodiment, in the touch image change step, when attack data is received from another game apparatus in the communication step, display of the touch image is changed. More specifically, in the touch image change step (42, S83, S85, S87), when the attack data is received from another game apparatus (10) in the communication step (32, 42, 64, S165), display of the touch image is changed. That is, the player can know from a change in display of the touch image that he/she has suffered an attack from the other game apparatus.

In another embodiment, in the touch image display step, the touch image is generated on the basis of three-dimensional graphics techniques including a three-dimensional graphics rendering process and a viewpoint conversion process to two-dimensional image. In the touch image display change step, a viewpoint position in the viewpoint conversion process is changed, at least according to evaluation in the touch evaluation step. More specifically, in the touch image display step (42, S43, S171), the touch image (102) is generated on the basis of three-dimensional graphics techniques including a three-dimensional graphics rendering process and a viewpoint conversion process to two-dimensional image. In the touch image display change step (42, S83, S85, S87), a viewpoint position in the viewpoint conversion process is changed, at least according to evaluation in the touch evaluation step. The viewpoint position can be changed in a height direction or a horizontal direction in a three-dimensional virtual space, for example, which makes it possible to shake the game screen (100) containing the touch image (102) vertically or laterally. As described above, display of the touch image can be altered just by changing the viewpoint position in the three-dimensional space, resulting in reduced processing burden on the processor.

In further another aspect of the example embodiment, the game program further allows execution of a change time period setting step of setting a time period during when display of the touch image is changed. In the touch image display change step, display of the touch image is changed for the time period set in the change time period setting step. More specifically, in the change time period setting step (42, S39, S83, S157), a time period during when display of the touch image is changed is set. In the touch image display change step (42, S83, S85, S87), display of the touch image (102) is changed for the set time period. As stated above, it is possible to know the degree of touch failure and the degree of attack according to the time period during which display of the touch image is changed.

In an embodiment, the game program further allows execution of a music performance step of performing music. In the touch timing control step, the first timing is controlled in synchronization with rhythm of the music performed in the music performance step. More specifically, in the music performance step (42, S13, S131), the music (tune) is performed. In the touch timing control step (42, a routine of S9 to S45, a routine of S127 to S173), the first timing is controlled in synchronization with the rhythm of the music performed in the music performance step (42, S13, S131). As mentioned above, since the first timing is timed to the rhythm of the music, it is possible to set the timing of the touch operation through listening to the music.

A storage medium storing another game program according to the example embodiment stores a game program for playing a match-up game with connection of two or more game apparatuses comprising a display means, a touch panel provided in relation to the display means, and a communication means. This game program allows a processor of each of the game apparatuses to execute a touch input detection step, a touch timing control step, a touch image display step, a touch timing detection step, a timing coincidence degree detection step, a touch position detection step, a touch evaluation step, an attack data transmission step, and an attack data reception step. In the touch input detection step, a touch input is detected. In the touch timing control step, a first timing with which a touch input is to be performed is processed. In the touch image display step, a touch image to be touched by a player is generated and displayed on the display means. In the touch timing detection step, a second timing for the touch input detected in the touch input detection step is detected. In the timing coincidence degree detection step, a degree of coincidence of the first timing and the second timing is detected. In the touch position detection step, it is detected whether or not a touch position indicated by the touch input represents a position to touch. In the touch evaluation step, the touch input is evaluated according to result of detection in the timing coincidence degree detection step and result of detection in the touch position detection step. In the attack data transmission step, attack data is transmitted to the other game apparatus via the communication means according to evaluation in the touch evaluation step. In the attack data reception step, attack data is received from the other game apparatus via the communication means. In the touch evaluation step, when attack data is received in the attack data reception step, the touch input is evaluated with the attack data taken into consideration.

More specifically, the game apparatus (10) is equipped with the display means (14), the touch panel (22) provided in relation to the display means, and the communication means (32, 64). The game program is executed by the processor (42) of the game apparatus (10). In the touch input detection step (42, S141), a touch input to the touch panel (22) is detected. In the touch timing control step (42, a routine of S127 to S173), the first timing with which the touch input is to be performed is processed. In the touch image display step (42, S171), the touch image to be touched by a player is generated and displayed on the display means (14). In the touch timing detection step (42), the second timing for the touch input detected in the touch input detection step (42, S141) is detected. In the timing coincidence degree detection step (42, S51), the degree of coincidence (a difference in the embodiments) of the first timing and the second timing is detected. In the touch position detection step (42, S143, S151), it is detected whether or not the touch position indicated by the touch input represents a position to touch. In the touch evaluation step (42, S143, S151), the touch input is evaluated according to result of detection in the timing coincidence degree detection step (42, S51) and result of detection in the touch position detection step (42, S149). That is, it is determined whether the touch has been given or not in the position to touch with the timing to touch. In the attack data transmission step (42, S165), attack data is transmitted to the other game apparatus (10) via the communication means (32, 64) according to evaluation in the touch evaluation step (42, S143, S151). In the attack data reception step (42, S167), attack data is received from the other game apparatus via the communication means. Thus, in the touch evaluation step (42, S143, S151), the touch input is evaluated with the attack data taken into consideration.

In the example embodiment, as in the case of the above described embodiment of storage medium, a touch is evaluated according to not only the touch timing but also the touch position, which allows the player to feel a new sense of game operations.

A game apparatus according to the example embodiment is equipped with a display means and a touch panel provided in relation to the display means. This game apparatus further comprises a touch input detection means, a touch timing control means, a touch image display means, a touch timing detection means, a timing coincidence degree detection means, a touch position detection means, and a touch evaluation means. The touch input detection means detects a touch input. The touch timing control means processes a first timing with which a touch input is to be performed. The touch image display means generates a touch image to be touched by a player and displays the same on the display means. The touch timing detection means detects a second timing for the touch input detected by the touch input detection means. The timing coincidence degree detection means detects a degree of coincidence of the first timing and the second timing. The touch position detection means detects whether or not a touch position indicated by the touch input represents a position to touch. The touch evaluation means evaluates the touch input according to result of detection in the timing coincidence degree detection step and result of detection by the touch position detection means.

As in the case of the above described embodiment of storage medium, this embodiment also allows the player to enjoy playing the game with a new sense of game operations.

Another game apparatus according to the example embodiment is equipped with a display means and a touch panel provided in relation to the display means and a communication means, and makes it possible to play a match-up game with connection of at least one of the other game apparatuses. This game apparatus further comprises a touch input detection means, a touch timing control means, a touch image display means, a touch timing detection means, a timing coincidence degree detection means, a touch position detection means, a touch evaluation means, an attack data transmission means, and an attack data reception means. The touch input detection means detects a touch input. The touch timing control means processes a first timing with which the touch input is to be performed. The touch image display means generates a touch image to be touched by a player and displays the same on the display means. The touch timing detection means detects a second timing for the touch input detected by the touch input detection means. The timing coincidence degree detection means detects a degree of coincidence of the first timing and the second timing. The touch position detection means detects whether or not a touch position indicated by the touch input represents a position to touch. The touch evaluation means evaluates the touch input according to result of detection by the timing coincidence degree detection means and result of detection by the touch position detection means. The attack data transmission means transmits attack data to the other game apparatus via the communication means according to evaluation by the touch evaluation means. The attack data reception step receives attack data from the other game apparatus via the communication means. In addition, the touch evaluation means, when attack data is received by the attack data reception means, evaluates the touch input with the attack data taken into consideration.

As in the case of the above described embodiment of storage medium, this embodiment also allows the player to enjoy playing the game with a new sense of game operations.

A game control method according to the example embodiment is a game control method for a game apparatus equipped with a display means and a touch panel provided in relation to the display means. This method includes steps of: (a) detecting a touch input; (b) processing a first timing with which a touch input is to be performed; (c) generating a touch image to be touched by a player and displaying the same on the display means; (d) detecting a second timing for the touch input detected in the step (a); (e) detecting a degree of coincidence of the first timing and the second timing; (f) detecting whether or not a touch position indicated by the touch input represents a position to touch; and (g) evaluating the touch input according to result of detection in the step (e) and result of detection in the step (f).

As in the case of the above described embodiment of storage medium, this embodiment also allows the player to enjoy playing the game with a new sense of game operations.

The above described features, aspects and advantages of the example embodiment presented herein will become more apparent from the following detailed description of the present invention when taken in conjunction with the accompanying drawings.

BRIEF DESCRIPTION OF THE DRAWINGS

FIG. 3 is an illustrative view showing an example of game screen displayed on a second LCD of FIG. 1 embodiment;

FIG. 4 is an illustrative view showing a game screen (touch images) displayed on the second LCD of FIG. 1 embodiment and an illustrative view showing a touch area set in a touch panel corresponding to each of the touch images;

FIG. 12 is an illustrative view showing one example of a game system of the present invention;

FIG. 15 is an illustrative view showing one example of record of touch evaluation;

DETAILED DESCRIPTION OF THE PREFERRED EMBODIMENTS

First Embodiment

Figure 1:
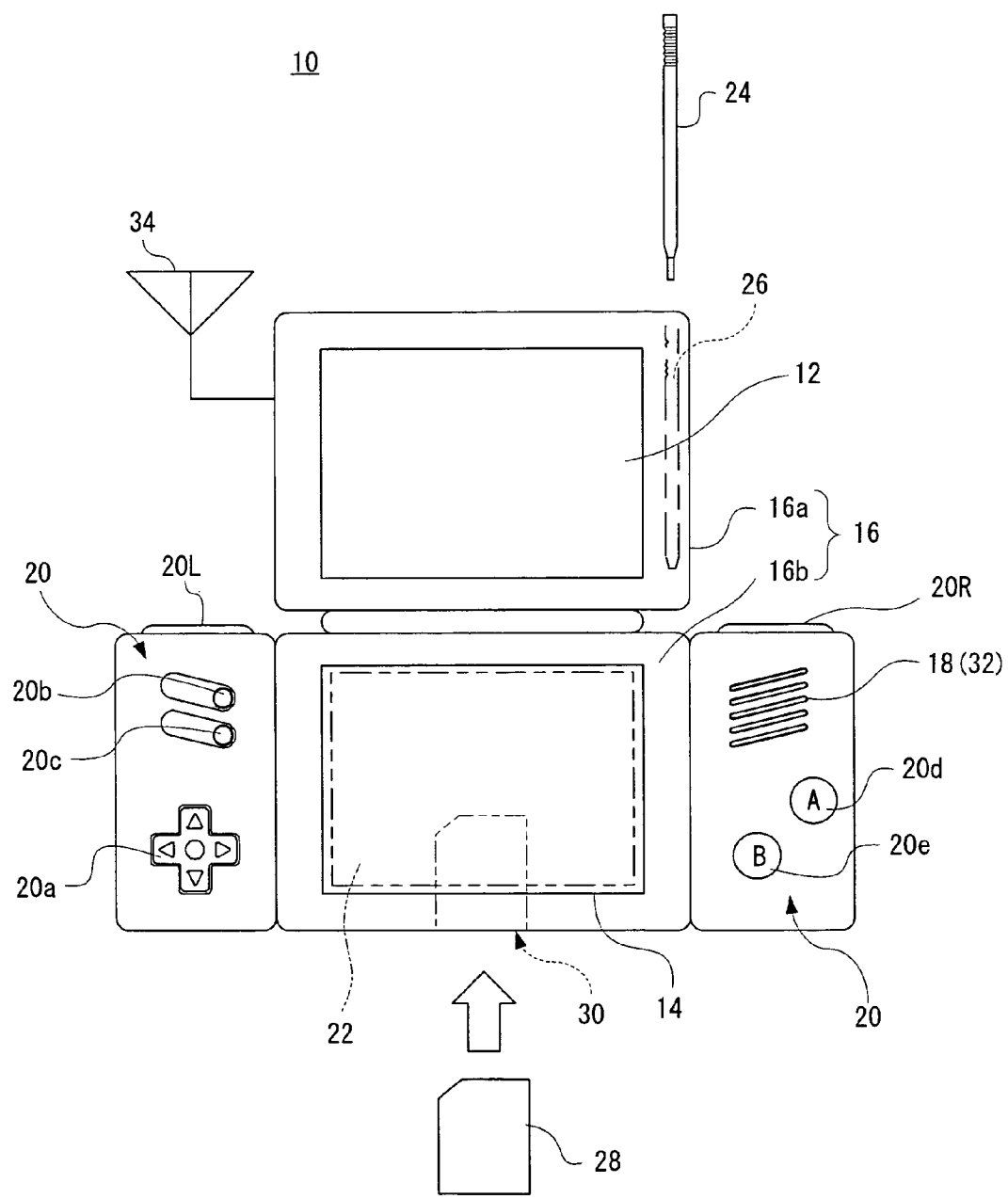
FIG. 1 is an illustrative view showing a game apparatus according to an example embodiment.

Referring to FIG. 1, a game apparatus 10 of first embodiment of the present invention includes a first liquid crystal display (LCD) 12 and a second LCD 14. The LCD 12 and the LCD 14 are stored in a housing 16 so as to be located in predetermined positions. In this embodiment, the housing 16 is formed by an upper housing 16a and a lower housing 16b. The LCD 12 is stored in the upper housing 16a and the LCD 14 is stored in the lower housing 16b. Accordingly, the LCD 12 and the LCD 14 are closely arranged in such a manner to line up vertically (above and below).

Some LCDs are used as displays in the first embodiment, and alternatively, EL (Electronic Luminescence) displays and plasma displays may be employed in place of the LCDs.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left push button) 20L and the action switch (right push button) 20R are formed by the push button, and the left push button (L button) 20L and the right push button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of position of operation (touch position) by means of the stick 24, etc. and outputs coordinate data corresponding to the detected coordinates (hereinafter referred to as "touch coordinates").

In this embodiment, a resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). However, detection accuracy of the detection surface of the touch panel 22 may be lower than the resolution of the display surface of the LCD 14, or higher than it.

The LCD 12 and the LCD 14 can display different game images (game screens). For example, a game screen for playing a game may be displayed on one LCD (e.g. the LCD 12) and a game screen (operating screen) for inputting text information for operating the game or specifying a predetermined image (such as icons) may be displayed on the other LCD (e.g. the LCD 14). This allows the player to input text information (commands) or specify a predetermined image (such as icons) on the LCD 14 by operating the touch panel 22 with the stick 24, etc.

As stated above, the game apparatus 10 has the LCD 12 and the LCD 14 as a display portion of two screens, and by providing the touch panel 22 on an upper surface of any one of them (LCD 14 in the first embodiment), the game apparatus 10 has the two screens (LCD 12, 14) and the two operating portions (20, 22).

Additionally, in this embodiment, the stick 24 can be stored in a housing portion (housing slot) 26 provided in proximity to a side surface (right side surface) of the upper housing 16a, for example, and taken out therefrom as necessary. However, in a case of not preparing the stick 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

Moreover, the game apparatus 10 includes an antenna 34. By transmitting or receiving weak radio waves through the antenna 34, it is possible to carry out wireless communications with another game apparatus 10. Although a detailed description is omitted, the weak wave radios transmitted or received by the game apparatus 10 are set at a degree of strength that is permitted under the Radio Law.

Although not illustrated in FIG. 1, a speaker 32 (see FIG. 2) is provided in a position corresponding to the sound hole 18 inside the lower housing 16b.

Furthermore, although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
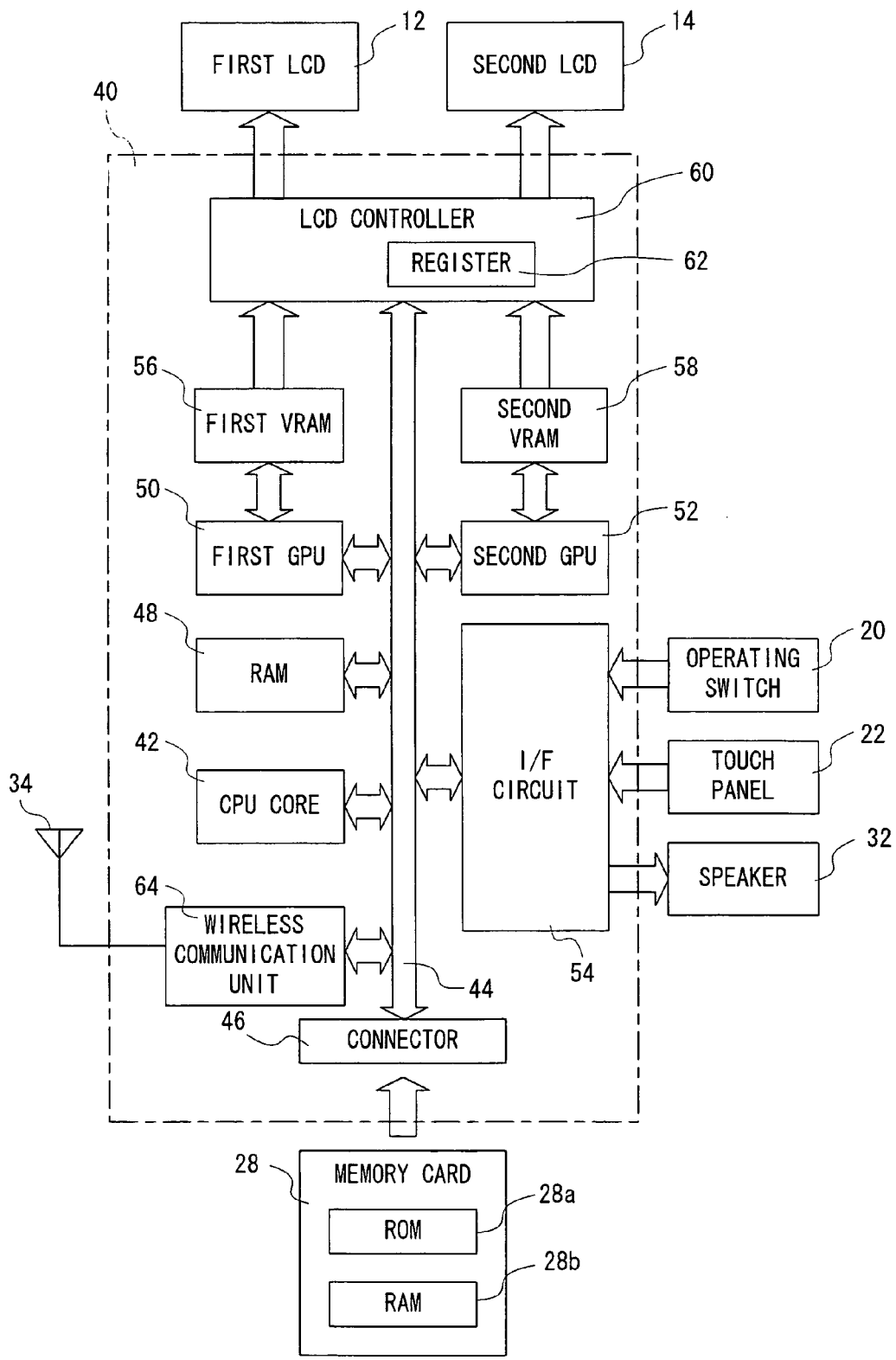
FIG. 2 is a block diagram showing an electric configuration of the game apparatus shown in FIG. 1 embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image (character image, background image, item image, icon (button) image, message image, etc.) data, data of the sound (music) necessary for the game (sound data), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing in the RAM 48 data (game data and flag data) temporarily generated in correspondence with a progress of the game.

Besides, such the game program, the image data, the sound data, etc. are loaded from the ROM 28a entirely at a time, or partially and sequentially so as to be stored (loaded) into the RAM 48.

Each of the GPU 50 and the GPU 52 forms a part of a rendering means, is constructed by, for example, a single chip ASIC, and receives a graphics command (graphics command) from the CPU core 42 to generate game image data according to the graphics command. However, the CPU core 42 provides each of the GPU 50 and the GPU 52 with an image generating program (included in the game program) required for generation of the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. Also, the CPU core 42 writes the image data required for graphics drawing into the first VRAM 56 and the second VRAM 58 via the GPU 50 and the GPU 52. The GPU 50 accesses the VRAM 56 to generate the game image data for graphics drawing, and the GPU 52 accesses the VRAM 58 to generate the game image data for graphics drawing.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. In a case that the data value of the register 62 is "0", the LCD controller 60 outputs the game image data generated by the GPU 50 to the LCD 12, and outputs the game image data generated by the GPU 52 to the LCD 14. Furthermore, in a case that the data value of the register 62 is "1", the LCD controller 60 outputs the game image data generated by the GPU 50 to the LCD 14, and outputs the game image data generated by the GPU 52 to the LCD 12.

Besides, the LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22, the speaker 32. Here, the operating switch 20 is the above-described switches 20a, 20b, 20c, 20d, 20e, 20L and 20R, and in response to an operation of the operating switch 20, a corresponding operation signal is input to the CPU core 42 via the I/F circuit 54. Furthermore, the coordinate position data from the touch panel 22 is input to the CPU core 42 via the I/F circuit 54. In addition, the CPU core 42 reads the sound data necessary for the game such as game music (BGM), sound effects and voices (onomatopoeic sounds) of game characters (game objects), etc. from the RAM 48, and outputs it from the speaker 32 via the I/F circuit 54.

As shown in FIG. 1, the game apparatus 10 is connected with the antenna 34. The antenna 34 is connected to a wireless communication unit 64. The wireless communication unit 64 is connected via a bus 44 to the CPU core 42. When the CPU core 42 provides game data or command to the wireless communication unit 64, the wireless communication unit 64 converts the game data or the like into an analog signal, and transmits (distributes) it from the antenna 34 by weak radio waves. Meanwhile, the wireless communication unit 64 receives via the antenna 34 the weak radio waves transmitted from another game apparatus 10, separates the analog signal from the received weak radio waves and converts the signal to a digital signal, and provides it to the CPU core 42. In this manner, wireless communications are carried out with another game apparatus 10. Therefore, if a plurality of (two or more) game apparatuses 10 are communicably connected, for example, those game apparatuses 10 can play same virtual game in communication with each other (communication game).

FIG. 3 (A) and FIG. 3 (B) are illustrative views showing one example of game screen (operating screen) displayed on the LCD 14. Although not represented in the drawings, the touch panel 22 is provided on the LCD 14 as described above. In addition, although not illustrated, the LCD 12 may display another game screen.

As shown in FIG. 3 (A) and FIG. 3 (B), the game screen 100 displays a plurality of touch images (hereinafter referred to as "marker image") 102. As can be understood from FIG. 3 (A) and FIG. 3 (B), the game screen 100 presents four marker images 102a, 102b, 102c, and 102d. The marker image 102 is an image or operation area on which the player performs a touch input (touch operation), and is provided as a circular image in this embodiment. Also, the marker image 102 is given (comes with display of) a code (number) indicating order of touch (operation). For example, the marker image 102 is touched in increasing order of number. Accordingly, in the game screen 100 shown in FIG. 3 (A) and FIG. 3 (B), the marker images 102a, 102b, 102c and 102c are to be touched in this order.

The number of marker images 102 to be displayed, the position(s) of the same (on the LCD 14) and the time period of display of the same (the number of frame(s)) are decided in advance, and the marker images 102 are displayed in time to the rhythm of music to be performed. At that time, although not expressed in the drawings, the music selected by the player (or arbitrarily selected by a computer (CPU core 42)) is output during the game from the speaker 32 (see FIG. 1 and FIG. 2). That is, the music is performed.

Besides, the number of the marker images 102 to be displayed and the display positions of the same may be changed according to the music to be performed or the game level (difficulty level).

Additionally, each of the marker images 102 is displayed together with a timing image (hereinafter referred to as "timer circle image") 104 for visibly displaying a touch timing (hereinafter may be referred to as "marker touch timing" for convenience in description). As shown in FIG. 3 (A) and FIG. 3 (B), a timer circle image 104a is displayed corresponding to the marker image 102a, a timer circle image 104b is displayed corresponding to the marker image 102b, a timer circle image 104c is displayed corresponding to the marker image 102c, and a timer circle image 104d is displayed corresponding to the marker image 102d.

As is clearly apparent from FIG. 3 (A) and FIG. 3 (B), the timer circle image 104 is ring-shaped and gradually changed in size (made smaller) with touch (operation) timing in such a manner as to coincide (overlap) with an outer periphery (edge) of the maker image 102. For example, the game screen 100 is updated at regular intervals of time (frame: screen update unit time (1/60 second)), and the size of the timer circle image 104 is changed each several to several tens of frames. In addition, since the marker touch timing needs to be specified in time to the rhythm of music, the performance time (the number of frames) of the music are synchronized with the screen update time (the number of frames).

For example, in the game screen 100 shown in FIG. 3 (A) and FIG. (B), the timer circle image 104a indicates the marker touch timing of the marker image 102a. FIG. 3 (A) shows a situation in which the stick 24 points at a portion on the touch panel 22 corresponding to the display position of the marker image 102a with the same or almost same timing as the marker touch timing of the marker image 102a. That is, this figure presents a situation in which the desired marker image 102a is touched with the same or almost same timing as the marker touch timing of the marker image 102a and the marker image 102a is successfully touched. Additionally, FIG. 3 (B) shows a situation in which the stick 24 points at a portion outside the touch panel 22 corresponding to the display position of the marker image 102a with the same or almost same timing as the marker touch timing of the marker image 102a. That is, this figure presents a situation in which a touch is given with the same or almost same timing as the marker touch timing of the marker image 102a but the marker image 102a is not pointed at, resulting in a failure of touch on the marker 102a.

Moreover, in FIG. 3 (A) and FIG. 3 (B), the marker 102a and the timer circle image 104a corresponding thereto are displayed in different sizes for easy distinction between the marker image 102 and the timer circle image 104. In actuality, however, an instant when an edge of the marker image 102a and the timer circle image 104a overlaps constitutes the marker touch timing of the marker image 102a. Although a detailed description is omitted, the same thing applies to the other marker images 102b, 102c, 102d and the timer circle images 104b, 104c, 104d.

Besides, touch operation is evaluated as a failure in such cases where the touch panel 22 is not touched at all or where the marker image 102a is not touched with the same or almost same timing as the marker touch timing of the marker image 102a, as well as in the case as described with FIG. 3 (B).

As described above, the number of the marker images 102 to be displayed, the display position(s) and display time of the same are previously decided in correspondence with the music to be performed. When the marker image 102 to be touched (the current marker image 102) is set, the corresponding portion on the touch panel 22 (hereinafter referred to as "touch area") 106 is decided. However, the marker image 102 is not displayed every time in the same position but displayed at a variable position set by the game programmer or developer. As stated above, in this embodiment, the resolution of the LCD 14 and the detection accuracy of the touch panel 22 are set at same value. Thus, by matching a coordinate system of the LCD 14 and a coordinate system of the touch panel 22, it is possible to set the touch area 106 by using central coordinates of the marker image 102 displayed on the LCD 14 and a radius thereof.

Accordingly, in the case of the game screen 100 as shown in FIG. 4 (A), for example, the touch area 106 is set in correspondence with each of the marker images 102, as shown in FIG. 4 (B). Here, a touch area 106a is set corresponding to the marker image 102a, a touch area 106b is set corresponding to the marker image 102b, a touch area 106c is set corresponding to the marker image 102c, and a touch area 106d is set corresponding to the marker image 102d.

In FIG. 4 (A), the timer circle 104 is omitted for prominence of the marker image 102.

Besides, although FIG. 4 (B) presents a situation in which the touch area 106 is set, coordinate data on the central coordinates of the touch area 106 and numerical value data on the radius thereof (radius data) are actually stored in the RAM 48 as described above.

Additionally, in FIG. 4 (B), the touch areas 106 are set to all the marker images 102 at one time. In actuality, for the purpose of invalidating any touch operations that are performed with undesired timing, the touch area 106 is set to the corresponding marker image 102 a predetermined time (e.g. 60 frames) ahead of the marker touch timing of each of the marker images 102, and then subsequent touch operations are evaluated.

Therefore, when the marker image 102 is displayed and the player touches the touch panel 22, coordinates of the touch position (touch coordinates) are detected, and it is detected whether the touch coordinates are contained in the touch area 106 of the marker image 102. More specifically, it is determined whether a distance between the central coordinates and the touch coordinates falls within the radius.

Besides, the central coordinates and radius of the touch area 106 corresponding to the marker image 102 are set in this first embodiment. For the marker image 102 of complicated shape, all the coordinates (dots) contained in the marker image 102 may be set as the touch area 106. In this case, it is determined whether or not there exist any coordinates matching with the touch coordinates in the touch area 106.

For example, a predetermined number of marker images 102 are displayed in their predetermined positions in time to the rhythm of the music (at the display time) as described above. When the player or the user has successfully touched the desired marker image 102, a point is added to his/her score. In addition, when he/she has continuously succeeded in touching the marker image 102, a higher point is added to the score and his/her survival power (the number of permissible failures) is increased within a maximum limit according to the number of continuous successes. Then, when the music has been performed to the end, the game is cleared. On the other end, when the player has failed in touching the marker image 102, no point is added to the score and his/her survival power is decreased. If his/her survival power has expired during the performance of the music (the number of permissible failure has become 0), the game is over.

Additionally, a successful touch and unsuccessful touch are expressed with some effects produced on the game screen 100. Although not illustrated, when the player has successfully touched, the value of the score calculated on the basis of the touch timing and the touch position is displayed in text form instead of the marker image 102. More specifically, the touched marker image 102 disappears from the game screen 100 and the score is displayed in the display position of the marker image 102. This indicates that the touch is successful. On the other hand, when the player has failed in touch, the game screen 100 is vertically (up and down) shaken (vibrated). That is, the display position of the marker image 102 is changed. However, even in the case of an unsuccessful touch, the desired marker image 102 is erased from the game screen 100. This indicates that the desired marker image 102 is not successfully touched, and also makes it more difficult to touch the next desired marker image 102. When the game screen 100 is vibrated, the position of touch area 106 on the touch panel 22 that is set corresponding to the marker image 102 is also changed according to a change in display position of the marker image 102.

Besides, the game screen 100 is vertically vibrated in the first embodiment, and alternatively, it may be laterally (right and left) vibrated instead. The game screen 100 is vertically vibrated so that, in a match-up game with another game apparatus 10 described later, when attacked by the other game apparatus 10, the game screen 100 is laterally vibrated thereby making a distinction between the unsuccessful touch and the other player's attack.

Here, in a virtual game of the first embodiment, background and characters such as persons and the marker images 102, etc. are arranged (rendered) in a three-dimensional virtual space (game space), and an image (two-dimensional image) seen from a virtual camera (viewpoint) is generated and displayed as the game screen 100 on the LCD 14. That is, through a viewpoint conversion process such as perspective projection conversion, an image of three-dimensional space seen from the viewpoint is projected onto a two-dimensional virtual screen, and the projected two-dimensional image is displayed as the game screen 100.

Therefore, in the first embodiment, when the game screen 100 is vertically vibrated due to an unsuccessful touch, the position of the viewpoint is vertically moved in the virtual space. At the same time, the touch area 106 set in the touch panel 22 is moved by a distance of movement on the two-dimensional screen (LCD 14) corresponding to an amount of the viewpoint movement (hereinafter referred to as "shake offset value"). That is, the touch area 106 is vibrated in synchronization with the game screen 100. As above, since the position to touch (touch area 106) is changed, it becomes difficult to touch the next desired image 102 with accuracy.

The shake offset value and a time during the game screen 100 is vibrated (hereinafter referred to as "shake time") are decided according to a degree of touch failure. The degree of touch failure here means a shift (difference) in touch timing or a shift (difference) in touch position. A difference in touch timing refers to a difference (the number of frames) between the marker touch timing and the timing with which the player actually touched (hereinafter referred to as "user touch timing" in some cases). In addition, a difference in touch position denotes a distance (the number of dots) between the center of the touch area 106 and the touch position.

For example, the shake offset value or the shake time value, or the both can be set linearly or stepwise according to the magnitude of a difference in touch timing or of a difference in touch position. The manners of setting the shake offset value and the shake time value can be arbitrarily decided by the game programmer or the game developer.

Moreover, the whole game screen 100 is vibrated in the first embodiment, and alternatively, only the marker image 102 may be vibrated. In this case, the viewpoint is fixed and the marker image 102 rendered in the three-dimensional space is vibrated up and down.

Furthermore, the whole game screen 100 is vibrated in the first embodiment, and alternatively, only the background screen may be vibrated, thereby notifying the player of only a touch failure.

Figure 5:
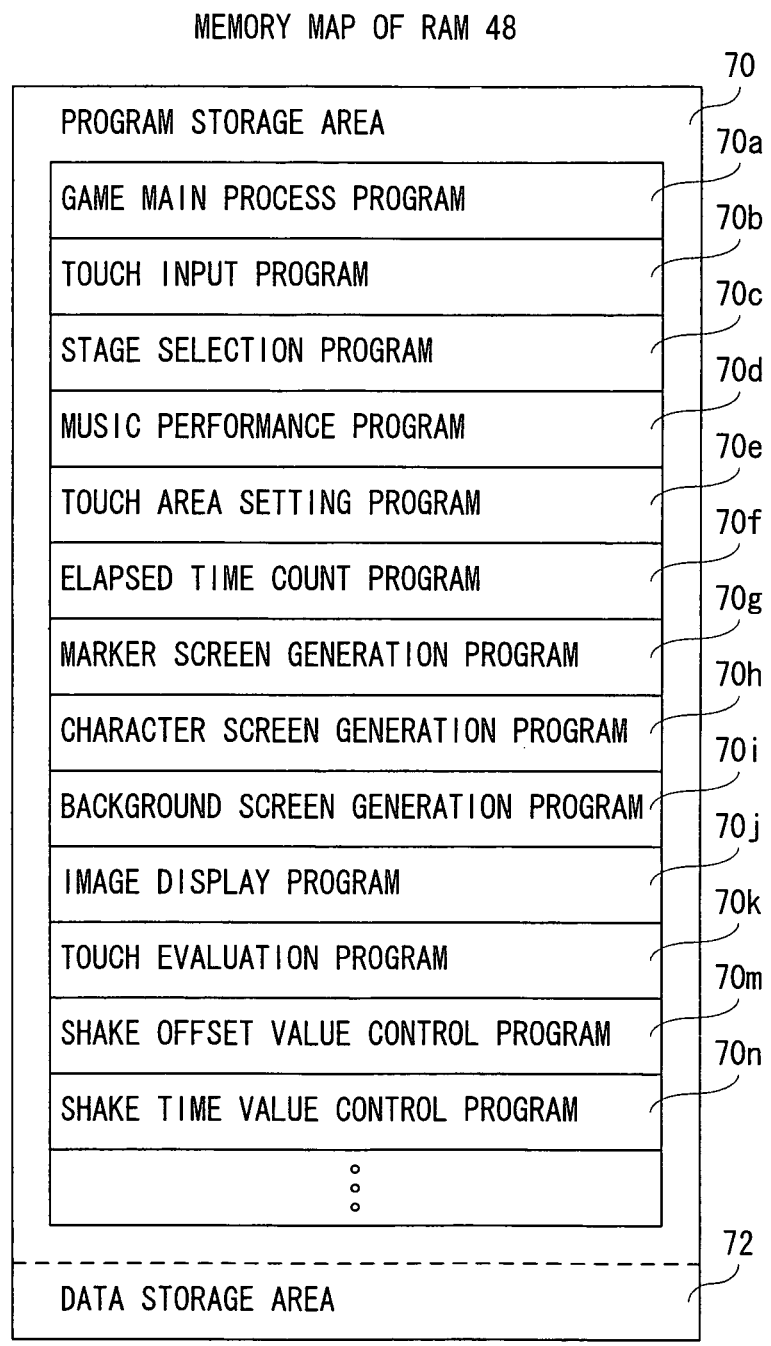
FIG. 5 is an illustrative view showing a memory map of a RAM shown in FIG. 2.

FIG. 5 is an illustrative view showing one example of memory map of the RAM 48 shown in FIG. 2. Referring to FIG. 5, the RAM 48 includes the program storage area 70 and the data storage area 72. The program storage area 70 holds a game program, and the game program is composed of a game main process program 70a, a touch input program 70b, a stage selection program 70c, a music performance program 70d, a touch area setting program 70e, an elapsed time count program 70f, a marker image generation program 70g, a character screen generation program 70h, a background screen generation program 70i, an image display program 70j, a touch evaluation program 70k, a shake offset value control program 70m and a shake time value control program 70n, etc.

The game main process program 70a is a program for processing a main routine of virtual game. The touch input program 70b is used to detect the presence or absence of coordinate data on touch coordinates input from the touch panel 22 and store (temporarily) the coordinate data, if any, in the data storage area 72 of the RAM 48. The stage selection program 70c is a program for selecting a stage, and is executed at a time of game start or for continuation of the game after a certain stage is cleared. This allows the player to select a desired stage (music and game level).

The music performance program 70d is a program for reproducing music (by-stage music performance data 72i described later) set (stored) in association with the stage selected according to the stage selection program 70c. Once the performance of the music has started, the music performance program 70d allows the music to be continuously reproduced in such a manner that the sound is output at regular intervals of time until the game is cleared or over. The touch area setting program 70e is used to set to the touch panel 22, out of the marker images 102 displayed on the game screen 100, the touch area 106 corresponding to the marker image 102 to be currently touched. More specifically, the coordinate data on the central coordinates of the touch area 106 and the radius data on the radius thereof are stored in the data storage area 72 of the RAM 48.

The elapsed time count program 70f is a program for counting a time elapsed (game elapsed time) from the game start (start of a stage) at determined time intervals (e.g. one frame). The elapsed time count program 70f is also a program for counting a time elapsed from a start of shake of the game screen 100 (shake elapsed time) at predetermined time intervals (one frame). Although omitted in FIG. 2, timers for counting the game elapsed time and the shake elapsed time are provided inside the game apparatus 10.

The marker screen generation program 70g is a program for generating a marker screen containing the marker image 102 and the timer circle image 104 by use of marker display data 72d described later. The character screen generation program 70h is a program for generating a character screen containing characters such as player characters by use of character display data 72e described later. The background screen generation program 70i is a program for generating a background screen by use of background display data 72f described later.

The image display program 70j displays on the LCD 14 the game screen 100 that is generated through combination of the marker screen, the character screen and the background screen produced according to the programs 70g, 70h and 70i, respectively. More specifically, those screens are overlapped in such a manner that the background screen is on a rear side, the marker screen is on a front side, and the character screen is placed between the background screen and the marker screen. The touch evaluation program 70k determines whether the player's touch operation is a success or a failure, and also detects a degree of success or a degree of failure.

More specifically, when the user gives a touch input, a difference between the user touch timing and the marker touch timing is detected, and if the difference (in touch timing) falls within a prescribed range (e.g. 20 frames) and the touch position is contained in the touch area 106, the touch is evaluated as a "success". At the same time, the degree of success is calculated on the basis of the difference in touch timing and the difference in touch position from the center of the touch area 106. In the first embodiment, the degree of success is reflected in the magnitude of a score to be given to a touch operation.

Besides, the touch is evaluated as a "failure" if no touch is given, if a difference in touch timing exceeds the prescribed range, or if a difference in touch timing falls within the prescribed range but the touch position is not within the touch area 106. In addition, the degree of failure is calculated on the basis of a difference in touch timing or a difference in touch position. In the first embodiment, the degree of failure is reflected in the shake offset value and the shake time value in the game screen 100.

The shake offset value control program 70m is a program for controlling (setting) a shake width of the game screen 100 (shake offset value). In the first embodiment, the shake offset value (shake width) is made smaller over time. More specifically, assuming that the shake width at a time of shake start is A and that the shake time value is T, a shake width a at a shake elapsed time t can be calculated according to equation 1.

$$a = A - A \times t/T \quad \text{[Equation 1]}$$

Sign of the shake width a is decided according to the shake elapsed time. For example, if the number of frames of the shake elapsed time t is an odd number, the sign is decided to be "+". If the number of frames of the shake elapsed time t is an even number, the sign is decided to be "−". These signs may be used in reverse. Also, these signs may be reversed each time the shake elapsed time exceeds a predetermined period of time.

The shake time value control program 70n is a program for controlling (setting) the shake time value, i.e., length of the shake time, based on the degree of touch failure, that is, a difference in touch timing or a difference in touch position.

Although not illustrated, the program storage area 70 also stores a game sound output program and a backup program, etc. The game sound output program is a program for reproducing sounds other than music performed (reproduced) according to the music performance program, that is, game characters' voice (imitative voice) and sound effects, etc. The backup program is a program for saving game data (in-progress game data and game result data) in the RAM 28b according to a predetermined event or the player's instruction.

Figure 6:
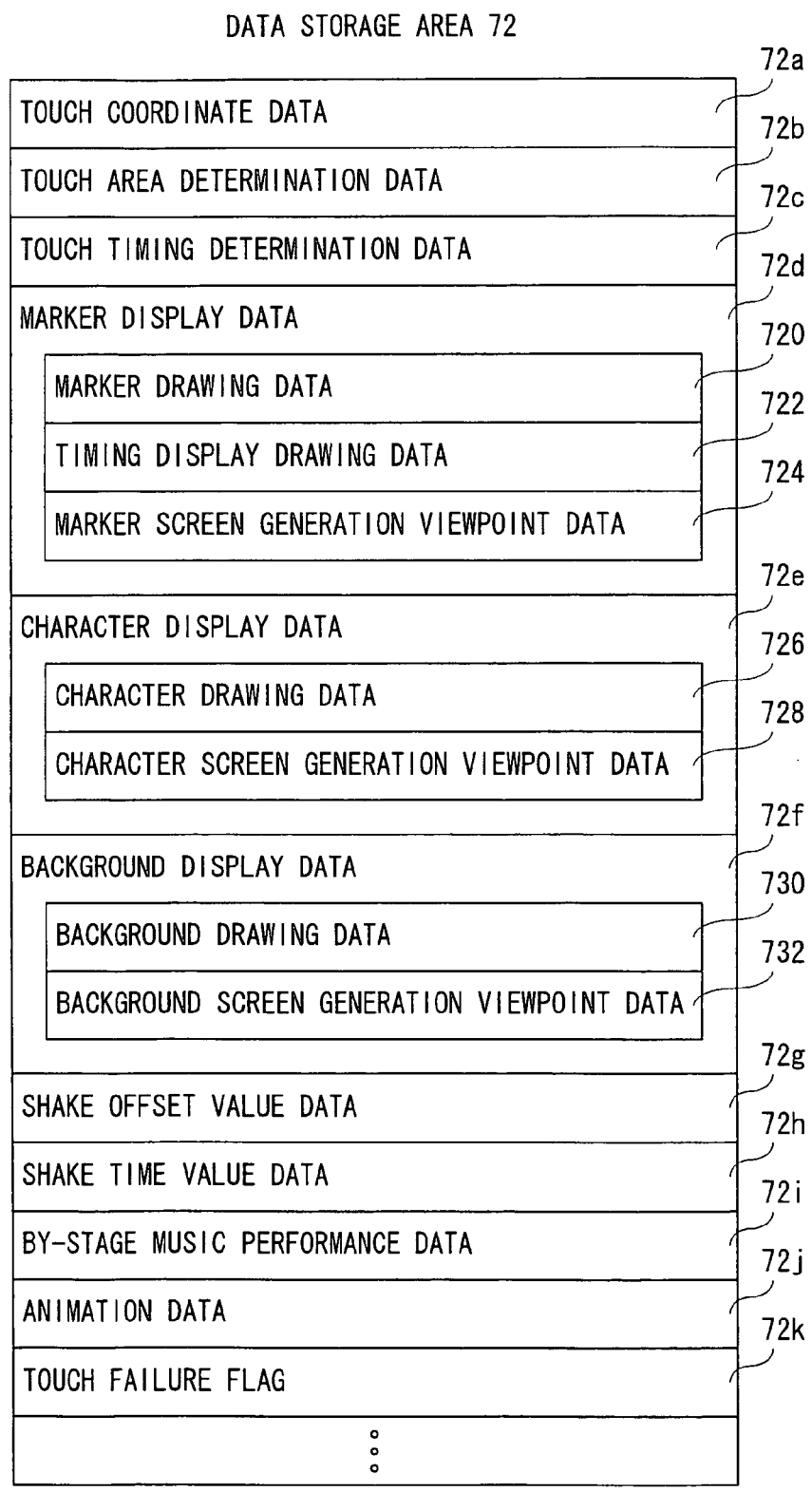
FIG. 6 is an illustrative view showing a data storage area shown in FIG. 5.

As shown in FIG. 6, the data storage area 72 stores touch coordinate data 72a, touch area determination data 72b, touch timing determination data 72c, marker display data 72d, character display data 72e, background display data 72f, shake offset value data 72g, shake time value data 72h, by-stage music performance data 72i, and animation data 72j, etc., and also stores flags including a touch failure flag 72k.

The touch coordinate data 72a is coordinate data on touch coordinates detected according to the touch input program 70a, as described above. The touch area determination data 72b is coordinate data on the central coordinates and radius data of the touch area 106 corresponding to the marker image 102 to be currently touched. The touch timing determination data 72c is data in which the marker touch timings (frame codes and number of frames) of all the marker images 102 displayed according to the music performed in the selected stage are aligned in chronological order. The touch timing determination data 72c is set according to the music to be performed, i.e., the by-stage music performance data 72i.

The marker display data 72d includes marker drawing data 720, timing display drawing data 722 and marker image generation viewpoint data 724. The marker drawing data 720 is image data for generating and displaying the marker image 102 (polygon data and texture data, etc. The same applies to following descriptions.) and arrangement position data for arranging the marker image 102 (coordinate data on three-dimensional position for modeling. The same applies to following descriptions.). The timing display drawing data 722 is image data and arrangement position data for generating and displaying the timer circle image 104. The marker screen generation viewpoint data 724 is coordinate data on the (three-dimensional) position of the viewpoint (virtual camera) for generating the marker screen.

The character display data 72e includes character drawing data 726 and character screen generation viewpoint data 728. The character drawing data 726 is image data and arrangement position data for generating and displaying various characters such as player characters, non-player characters and item characters. The character screen generation viewpoint data 728 is coordinate data on the three-dimensional position of the viewpoint for generating a character screen.

The background display data 72f includes background drawing data 730 and background screen generation viewpoint data 732. The background drawing data 730 is image data and arrangement position data for generating and displaying a background image (background object). The background screen generation viewpoint data 732 is coordinate data on the three-dimensional position of the viewpoint for generating a background screen.

Besides, the marker screen generation viewpoint 724, the character screen generation viewpoint data 728 and the background screen generation viewpoint data 732 can be the same if these screens are identical in coordinate system (three-dimensional coordinate system) and scale. If their coordinate systems and scales are different, these data are individually set as appropriate according to differences in coordinate system and scale.

The shake offset value data 72g is numerical value data on the shake offset value controlled (set) according to the shake offset value control program 70m, as described above. The shake time value data 72h is numerical value data on the shake time value controlled (set) according to the shake time value control program 70n, as stated above. The by-stage music performance data 72i is data (musical score data) on the music (tune) predetermined for each of the stages. The music is performed according to the musical score data. Although not illustrated, the data storage area 72 also stores the data on sounds to be output. The animation data 72j is data for displaying a character in the form of animation (in motion).

The touch failure flag 72k is a flag indicating whether the touch evaluation is "failure" or not, that is, whether the shake due to a touch failure is effective or not, and it is composed of a one-bit register. For example, if the touch failure flag 72k is on (established), a data value "1" is set to the register. If the touch failure flag 72k is off (not established), a data value "0" is set to the register.

Although not illustrated, the data storage area 72 also stores other data such as sound data and game data, and further stores flags other than the touch failure flag 72k.

Figure 7:
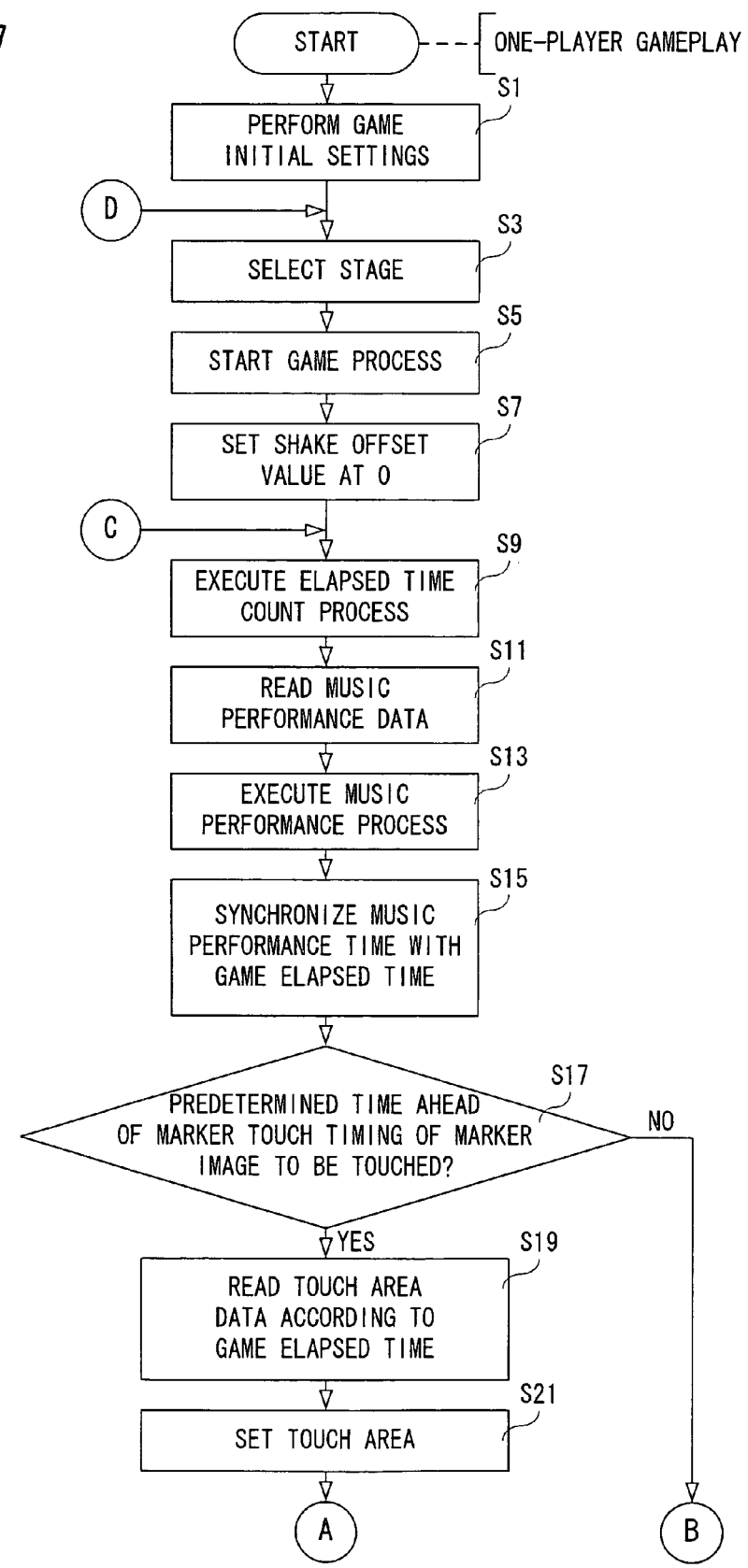
FIG. 7 is a flowchart showing a part of game entire process (one-player gameplay) of a CPU core shown in FIG. 2.
Figure 8:
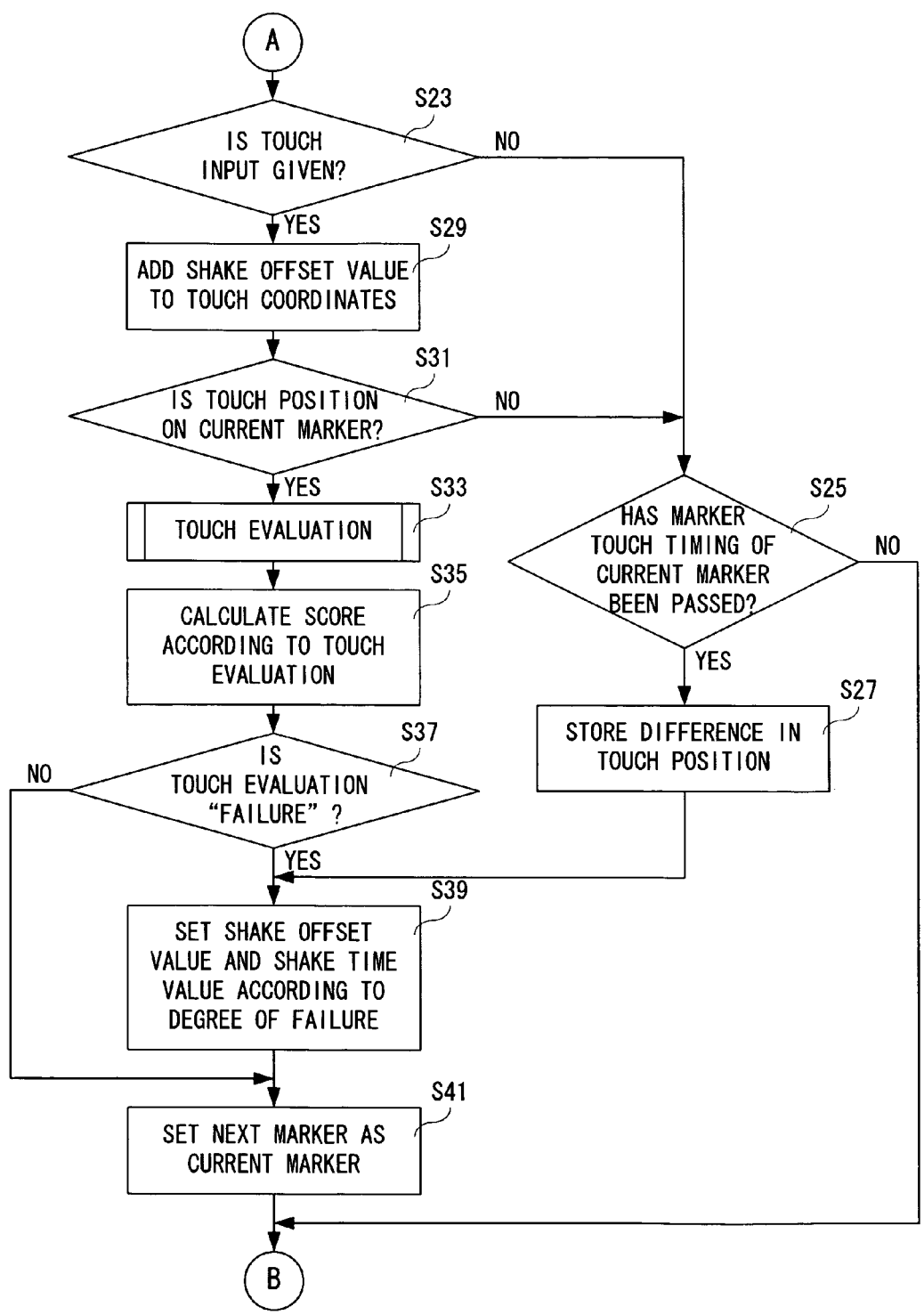
FIG. 8 is a flowchart showing another part of game entire process (one-player gameplay) of the CPU core shown in FIG. 2 and continued from FIG. 7.
Figure 9:
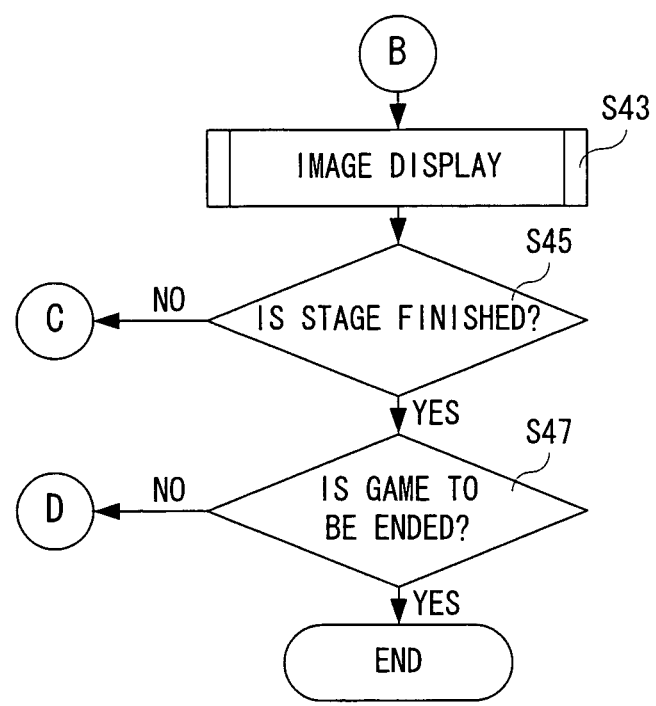
FIG. 9 is a flowchart showing still another part of game entire process (with one player) of the CPU core shown in FIG. 2 and continued from FIG. 7 and FIG. 8.

More specifically, the CPU core 42 shown in FIG. 2 executes a game entire process as shown in FIG. 7 to FIG. 9. The game entire process shown in FIG. 7 to FIG. 9 is a process for one-player gameplay. As shown in FIG. 7, when starting the game entire process, the CPU core 42 makes game initial settings in a step S1. For example, in starting the game from the beginning, a buffer area and flags are initialized. Additionally, in resuming the game where it was left off, saved game data is loaded and flags are set.

In a succeeding step S3, a stage is selected. Here, although not illustrated, a screen for stage selection is displayed on the LCD 14 (or the LCD 12), and a stage at which the game is to be played is selected by the player through a touch input or a switch operation. Alternatively, the CPU core 42 may select a stage under a predetermined rule (at random or by using random numbers). In a next step S5, a game process in association with the stage selected in the step S3 is started. Subsequently, the shake offset value is set as 0 in a step S7. That is, the shake offset value data 72g is initialized (reset). At that time, the touch failure flag 72k is turned off.

In a next step S9, an elapsed time count process is carried out. In the elapsed time count process, a game process is started for each of the stages and also the timer (not shown) for counting an elapsed time from the start of the game process (game elapsed time) is reset and started, and after that, the count value of the timer is incremented at predetermined time intervals (one frame). Then, the music performance data is read in a succeeding step S11, and the music performance process is carried out in a step S113. More specifically, a musical note for the frames indicated by the game elapsed time is acquired for the musical score data, and then one frame of sound is output. Subsequently, in a step S15, the music performance time and the game elapsed time are synchronized. Although a detailed illustration is omitted, it is determined in the step S15 whether the game elapsed time lags behind the music time, and if there is a time lag, a value of proper frame (elapsed time) is obtained from the music performance time, and the count value of the timer for the game elapsed time is corrected (set). If the game elapsed time does not lag behind the music performance time, no adjustment is made.

Then, it is determined in a step S17 whether or not now is a predetermined time (e.g. 60 frames) ahead of the marker touch timing of the marker image 102 to be touched. If "NO" in the step S17, that is, if now is more than a predetermined time ahead of the marker touch timing for the marker image 102 to be touched, the process moves directly to a step S41 shown in FIG. 9. However, if "YES" in the step S117, that is, if now is just a predetermined time ahead of the marker touch timing for the marker image 102 to be touched, the touch area data according to the game elapsed time is read in a step S19, and the touch area 106 is set in a step S21, and then the process goes to a step S23. More specifically, the central coordinates and radius of display area of the marker image 102 to be currently touched are read in the step S19, and the coordinate data corresponding to the read central coordinates and the radius data corresponding to the read radius are stored as the touch area determination data 72b in the data storage area 72 of the RAM 48.

As shown in FIG. 8, it is determined in a step S23 whether a touch input is given or not. Here, it is determined whether or not coordinate data is input from the touch panel 22. If "NO" in the step S23, that is, if no coordinate data is input from the touch panel 22, it is concluded that no touch input is given, and then it is determined in a step S25 whether the marker touch timing for the current marker image 102 has been passed or not. If "NO" in the step S25, that is, if the marker touch timing for the current marker image 102 has not yet been passed, the process moves directly to the step S43 shown in FIG. 9. On the other hand, if "YES" in the step S25, that is, if the marker touch timing for the current marker image 102 has been already passed, it is concluded that the touch evaluation is "failure", and a difference in touch position is stored in a step S27, and then the process goes to a step S39. However, if it is concluded in the step S23 that no touch input was given, a difference in touch position cannot be detected, and thus the process of step S27 is not carried out. In this case, neither a difference in touch timing nor a difference in touch position is acquired.

If "YES" in the step S23, that is, if coordinate data is input from the touch panel 22, it is concluded that a touch input is given, and the shake offset value is added to the touch coordinates in a step S29. To be more precise, a moving distance on the two-dimensional screen (LCD 14) corresponding to the shake offset value for movement of the viewpoint is added to the touch coordinates. However, if "YES" in the step S23, the CPU core 42 stores the detected coordinate data as the touch coordinate data 72a in the data storage area 72 of the RAM 48, and also stores (temporarily) the game elapsed time, i.e., the user touch timing at that moment in the buffer area. Since the game entire process shown in FIG. 7 to FIG. 9 is for one-player gameplay, shake just takes place due to the touch failure, and the offset value is added to the Y coordinate (in the vertical direction) of the touch coordinates.

In a succeeding step S31, it is determined whether the touch position is on the current marker image 102 or not. More precisely, as described in the above step S21, the touch area 106 is set corresponding to the touch panel 22, and thus it is determined whether the touch position is contained in the touch area 106. That is, it is determined whether a distance between the touch coordinates and the central coordinates of the touch area 106 falls within the radius of the touch area 106. If "NO" in the step S31, that is, if the touch position is not on the current marker image 102, the process goes directly to the step S25. However, if "YES" in the step S31, that is, if the touch position is on the current marker image 102, a touch evaluation process described later is carried out in a step S33, and a score is calculated according to the touch evaluation.

Here, the score is calculated according to a difference in touch timing and a difference in touch position. For example, the score becomes high if a difference in touch timing and a difference in touch position are small, and the score becomes low if a difference in touch timing and a difference in touch position are large. Therefore, for example, it is possible to calculate the score linearly or in stages between the highest score and the lowest score. However, if the touch evaluation is "failure", it is concluded that no score (zero point) will be given without score calculation. The manner of calculation can be arbitrarily set by the game programmer or developer, and will not be here described in detail because this is not essentially related to the present invention.

In succeeding step S37, it is determined whether the touch evaluation is "failure" or not. If "NO" in the step S37, that is, if the touch evaluation is "success", the process moves directly to a step S41. However, if "YES" in the step S37, that is, if the touch evaluation is "failure", the shake offset value (more precisely, an initial value of shake offset) and the shake time value are set according to the degree of failure (a difference in touch timing or a difference in touch position) in the step S39, and then the process goes to the step S41. However, as described above, if it is concluded that the touch was failure because no touch was given, neither of a difference in touch timing nor a difference touch position is obtained. In this case, the predetermined shake offset value and shake time value are set in the step S39.

In the step S41, the marker image 102 to be touched next is set as the current marker image 102. More specifically, the touch timing data (frame number data) of the current marker image 102 contained in the touch timing determination data 72c is deleted. Next, in the step S43 shown in FIG. 9, an image display process described later (see FIG. 11) is carried out, and it is determined whether the stage is finished or not in the step S45. That is, it is determined whether the performance of the music is finished or not or whether the game is over or not. If "NO" in the step S45, that is, if the stage is not yet finished, the process returns to the step S9 shown in FIG. 7.

Besides, a scan time of step S9 to step S45 is one frame, and thus the game elapsed time is counted for each frame.

In addition, although not illustrated, the touch failure flag 72k is turned off when the process returns from the step S45 to the step S9.

On the other hand, if "YES" in the step S45, that is, if the stage is finished, it is determined in a step S47 whether the game is to be ended or not. Although not illustrated here, a screen for selection of continuation of the game is displayed for the player to select whether to continue the game or not. If the game is to be continued, the conclusion becomes "NO" in the step S47, the process returns to the step S3 shown in FIG. 7. However, if the game is not to be continued, the conclusion becomes "YES" in the step S47, the game entire process is terminated.

Figure 10:
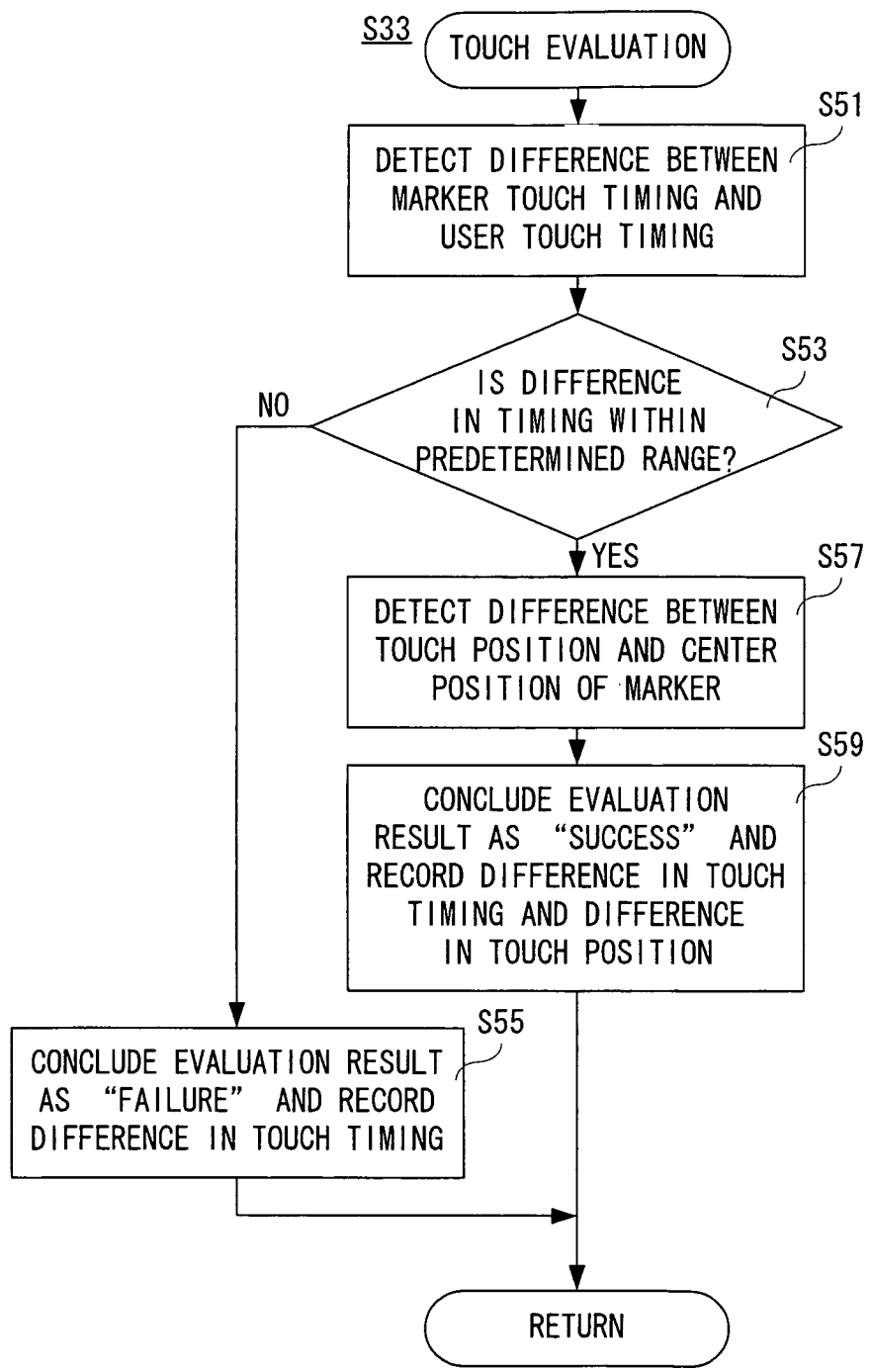
FIG. 10 is a flowchart showing a touch evaluation process of the CPU core shown in FIG. 2.

FIG. 10 is a flowchart showing the touch evaluation process shown in the step S33 of FIG. 8. Referring to FIG. 10, when starting the touch evaluation process, the CPU core 42 detects a difference between the marker touch timing and the user touch timing in a step S51. Here, a difference between the number of frames contained in the touch timing determination data 72c and the number of frames indicated by the game elapsed time when a touch input is given is calculated.

In a succeeding step S53, it is determined whether the difference in touch timing detected in the step S51 falls within a predetermined range (e.g. +20 frames). If "NO" in the step S53, that is, if the difference in touch timing is out of the predetermined range, the evaluation result is "failure" in a step S55, the result is (temporarily) stored in the buffer area of the RAM 48 together with the data on the difference in touch timing, and then the touch evaluation process is returned. Although not shown, the touch failure flag 72k is turned on in the step S55. On the other hand, if "YES" in the step S53, that is, if the difference in touch timing falls within the predetermined range, a difference in the touch position and the central coordinates of the marker image 102 is detected in a step S57. More precisely, a difference (distance) between the touch position and the central coordinates of the touch area set in the touch panel 22 is calculated, as described above. Then, the evaluation result is concluded as "success" in a step S59, the result is temporarily stored in the buffer area of the RAM 48 together with the data on the difference in touch timing and the difference in touch position, and then the touch evaluation process is returned.

Figure 11:
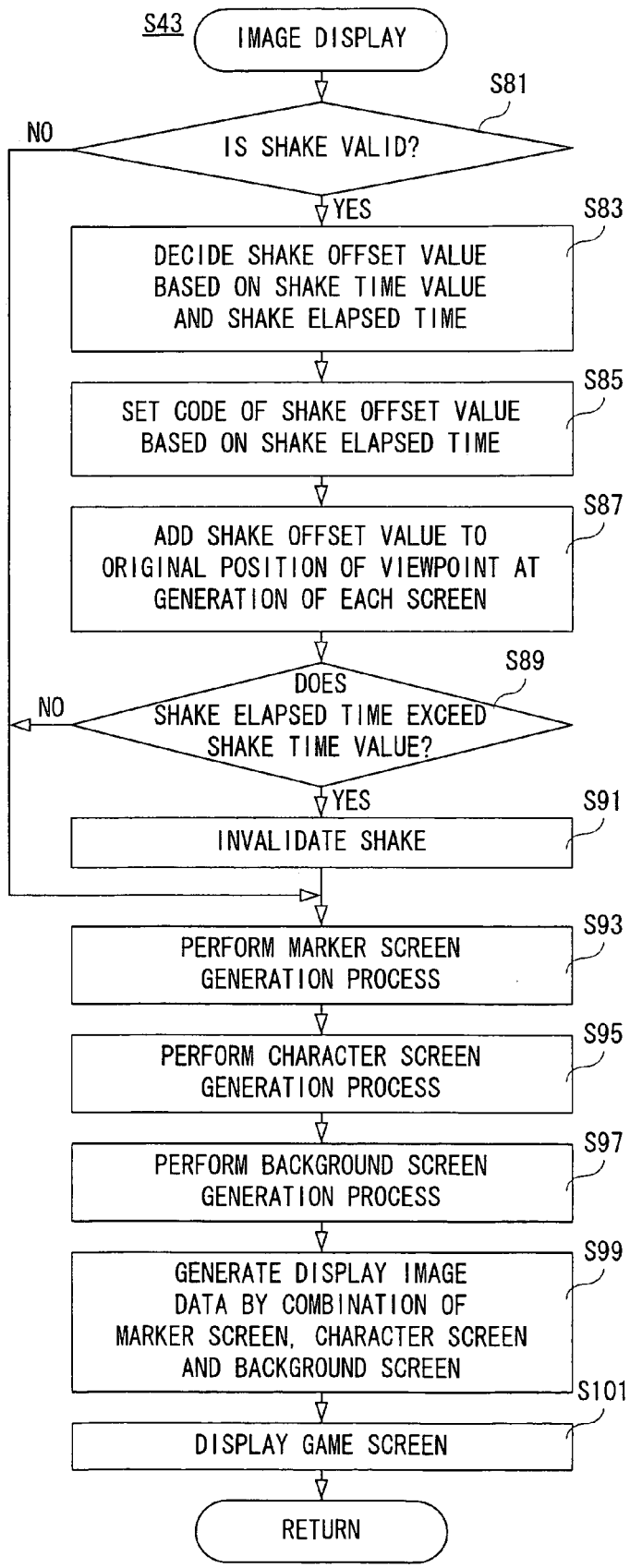
FIG. 11 is a flowchart showing an image display process of the CPU core shown in FIG. 2.

FIG. 11 is a flowchart showing the image display process of step S43 shown in FIG. 9. Referring to FIG. 11, when starting the image display process, the CPU core 42 determines in a step S81 whether the shake is valid or not. Here, it is determined whether the touch failure flag 72k is turned on or not. If "NO" in the step S81, that is, if the touch failure flag 72k is off, it is concluded that the shake is invalid, and the process moves directly to a step S93.

On the other hand, if "YES" in the step S81, that is, if the touch failure flag 72k is on, it is concluded that the shake is valid, and the shake offset value is decided on the basis of the shake time value and the shake elapsed time in a step S83. That is, the shake offset value is calculated according to equation 1. However, at the moment (frame) of touch failure, the shake offset value does not need to be decided in the step S83, and thus the initial value of shake offset decided in the step S39 is utilized. Besides, when a touch failure occurs, the game screen 100 starts to shake as described above, and at the same time, the timer starts to count the shake elapsed time.

In a succeeding step S85, the sign of the offset value is set on the basis of the shake elapsed time. Then, the offset value is added to the original viewpoint positions at a time of generation of the screens. More specifically, a numerical value indicated by the offset value is added to the three-dimensional coordinates in a height direction (Z axis direction) indicated by the marker screen generation viewpoint data 724, the character screen generation viewpoint data 728 and the background screen generation viewpoint data 732. Subsequently, it is determined in a step S89 whether the shake elapsed time is equal to or more than the shake time value. If "NO" in the step S89, that is, if the shake elapsed time is less than the shake time value, the process goes directly to the step S93. On the other hand, if "YES" in the step S89, that is, if the shake elapsed time is equal to or more than the shake time value, the shake is invalidated in a step S91, that is, the touch failure flag 72k is turned off in the step S91, and then the process moves to the step S93.

In the step S93, the marker screen generation process is carried out. In some cases, however, there may not exist the marker image 102 to be displayed if the game elapsed time is not the displayed time. Next, the character screen generation process is carried out in a step S95, and the background screen generation process is executed in a step S97. Then, the marker screen data, the character screen data and the background screen data are combined into the display image data in a step S99. For the combination, these screens are overlapped in such a manner that the background screen is on the rear side, the marker screen is on the front side and the character screen is placed between the marker screen and the background screen, as described above. After that, the game screen 100 is displayed in a step S101, and then the image display process is returned.

According to the first embodiment, it is determined whether the touch is successful or not through detection of not only the touch timing but also the touch position when the player performs a touch operation. This offers an unprecedented sense of game operations and increases the variety of the game. That is, the player can enjoy the game with a new feeling of game operation. Additionally, this game is of a higher difficulty level as compared with other games in which timing is merely set, which would avoid the player from losing interest in playing the game as much as possible.

Besides, in the first embodiment, since there is no communication with another game apparatus 10, it is not necessary to provide the game apparatus 10 with communication facilities such as the antenna 34 and the wireless communication unit 64.

Second Embodiment

A game system 200 of second embodiment shown in FIG. 12 (hereinafter referred to just as "system") is composed of the game apparatus 10 shown in the first embodiment. As can be seen from FIG. 12, the system 200 is composed of two game apparatuses 10, and also may be composed of three or more units. In the system 200, the game apparatuses 10 are connected in such a manner as to be capable of carrying out communications (wireless communications in this embodiment) between them, where one game apparatus 10 serves as parent device and the other game apparatus 10 serves as child device.

As described above, in the system 200 composed of three or more game apparatuses 10, one game apparatus 10 serves as parent device and all the other game apparatuses 10 serve as child devices.

Although there are various ways to decide the parent device, it is possible, for example, to display a screen for selection of the parent device after a start of wireless communications so that the player can select whether or not to make his/her apparatus the parent device. Alternatively, it is conceivable to decide as parent device the game apparatus 10 on which any button has been firstly operated after a start of wireless communications. When the parent device has been decided, the other game apparatuses 10 are decided as child devices.

This system 200 allows the game apparatuses 10 to play a communication game (match-up gameplay) between them. In this case, the player may make an attack against the opponent to obstruct (interfere with) the opponent's gameplay and suffer the opponent's attack. That is, in the second embodiment, the game screen 100 (the marker image 102) shakes due to not only the player's own touch failure but also the opponent's attack. Additionally, the game screen 100 shakes laterally (right and left) due to the opponent's attack in the second embodiment for making a distinction between the shake of the game screen 100 resulting from the player's own touch failure and the shake of the game screen 100 resulting from the opponent's attack.

For match-up gameplay, the same processes as those for one-player gameplay described in relation to the first embodiment are executed by each of the game apparatuses 10, except that the player makes an attack against the opponent and suffers the opponent's attack. Thus, duplicate descriptions of those processes are omitted below.

Figure 13:
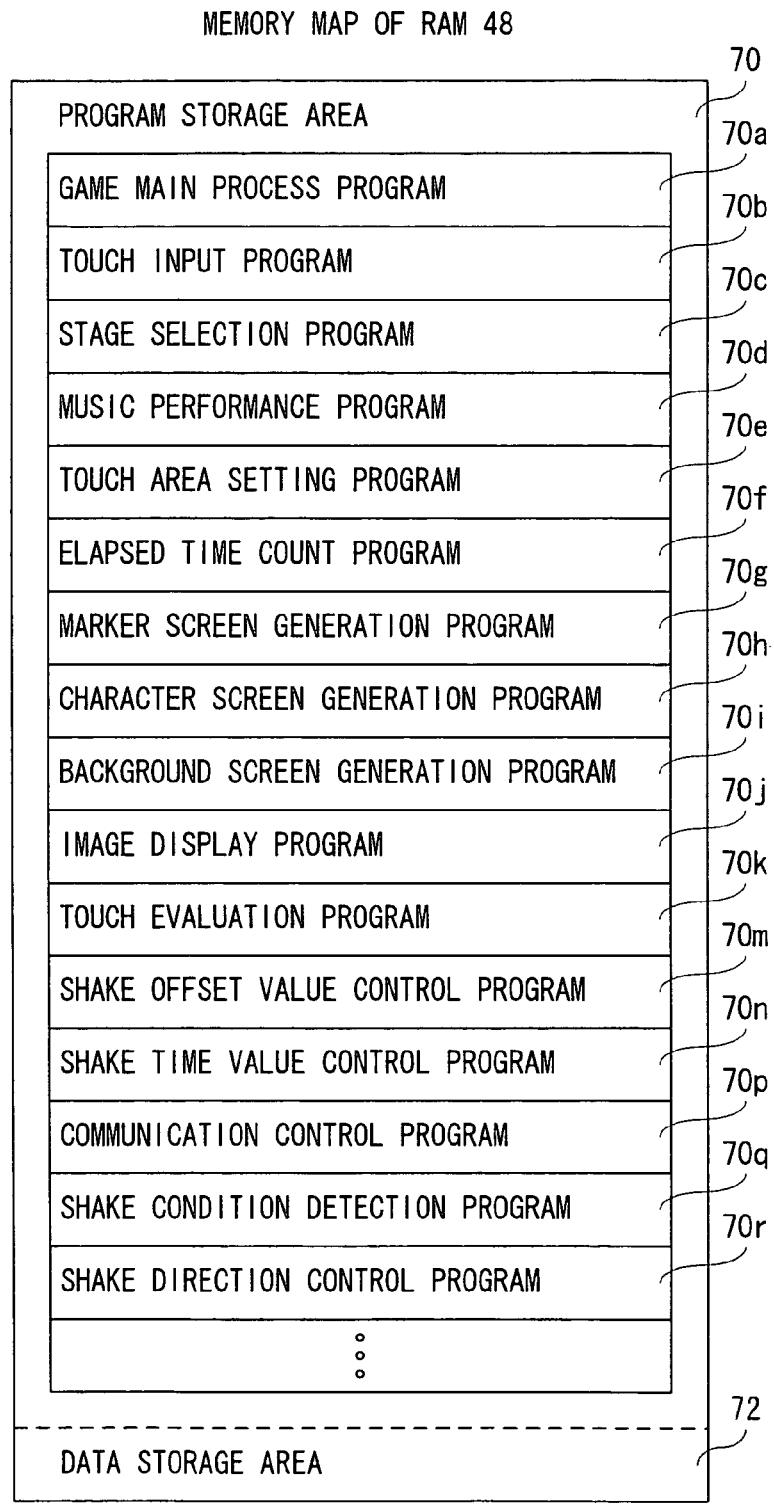
FIG. 13 is an illustrative view showing an example of memory map of the RAM of the game apparatus shown in FIG. 12.

FIG. 13 is an illustrative view showing a memory map of RAM 48 of the game apparatus 10 in the second embodiment. The game program shown in FIG. 13 includes a communication control program 70$p$, a shake condition detection program 70$q$, and a shake direction control program 70$r$ in addition to the game programs of the first embodiment (FIG. 5).

The communication control program 70$p$ is a program for data communications, that is, exchange of game information with another game apparatuses 10. The shake condition detection program 70$q$ is a program for, in performing match-up gameplay with another game apparatus 10, detecting a condition under which it is determined whether or not to transmit attack data to the other game apparatus 10. The attack data here denotes data for vibrating the game screen 100 (the marker image 102) and touch area 106 of the other game apparatus 10. For example, the attack data includes the shake offset value data and the shake time value data. The shake direction control program 70$r$ is a program for controlling a direction of vibration of the game screen 100 (the marker image 102). In the second embodiment, for vibrating the game screen 100 due to the player's own failure, the direction of shake is set to be vertical (up and down). For vibrating the game screen 100 due to the opponent's attack, the direction of shake is set to be lateral (right and left).

Figure 14:
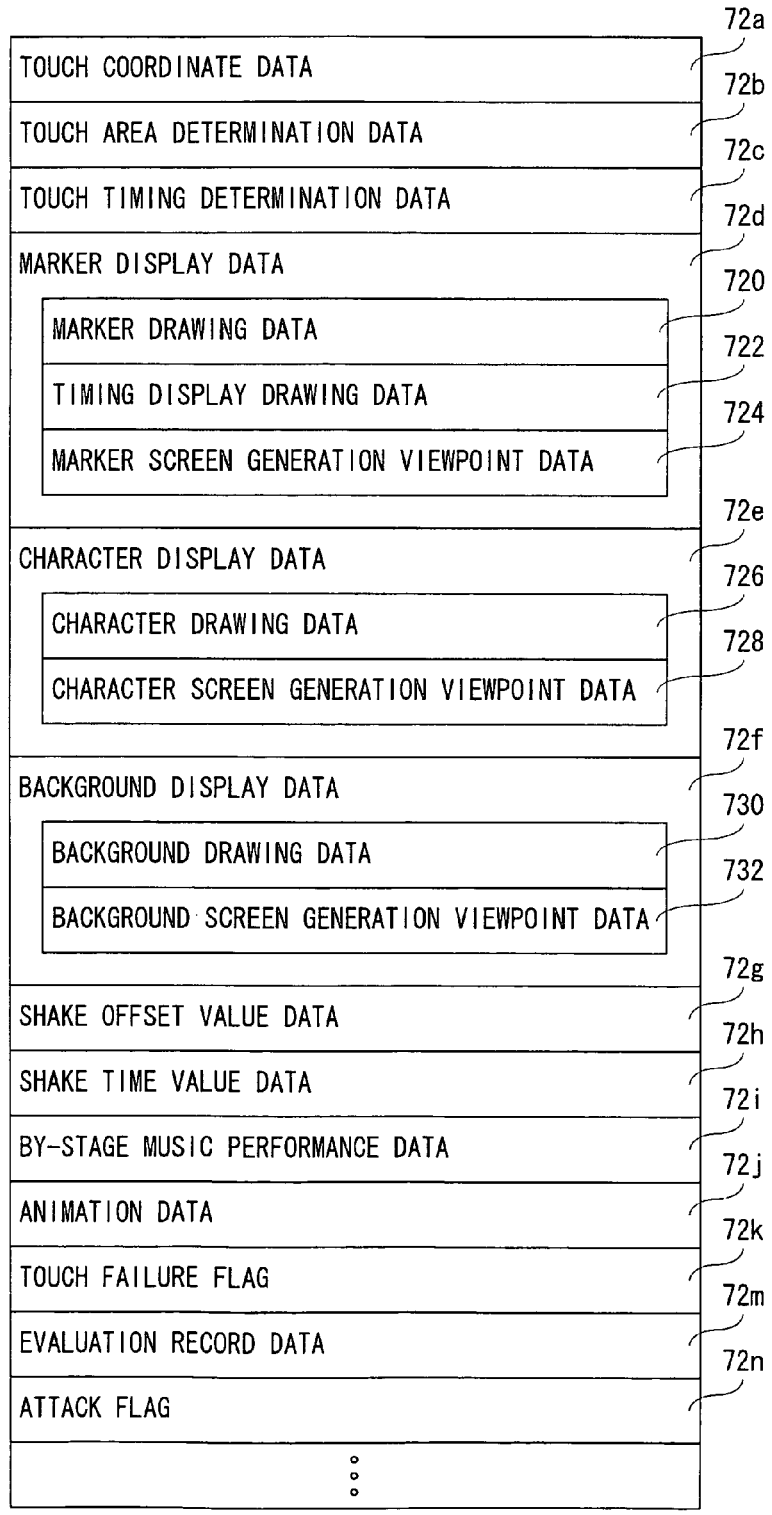
FIG. 14 is an illustrative view showing an example of data storage area of memory map shown in FIG. 13.

In addition, FIG. 14 is an illustrative view showing the data storage area 72 of RAM 48 in the second embodiment. The data storage area 72 is the same as the data storage area 72 shown in relation to the first embodiment (see FIG. 6) except that it further stores an evaluation record data 72$m$ and an attack flag 72$n$.

The evaluation record data 72$m$ is a record of touch evaluations that are recorded and updated in playing a match-up game. The touch evaluation is carried out in the same manner as with the first embodiment, and the evaluation result is decided (determined) as "success" or "failure", the degree of success and the degree of failure are detected, and then a record of them is stored.

For example, an evaluation record is presented in table as shown in FIG. 15. Referring to FIG. 15, an evaluation result, a difference in touch timing (the number of frames) and a difference in touch position (the number of dots) are stored as the evaluation record corresponding to the number of times an evaluation is performed. The number of times an evaluation is performed corresponds to each of the marker images 102 previously decided in association with the music to be performed, and denotes the number of evaluations in order of touch (chronological order). The evaluation indicates result of touch evaluation and is described as "success" or "failure". In addition, a difference in touch timing and a difference in touch position are stored as degree of success and degree of failure. However, if a difference in touch timing is out of a predetermined range (e.g. 20 frames), a difference in touch position is not detected. This is shown with display of a horizontal line. In addition, although not illustrated, if the touch is determined as "failure" because no touch was given, a horizontal line is displayed in both the section of difference in touch timing and the section of difference in touch position.

The attack flag 72$n$ is a flag indicating whether the opponent has made any attack or not, that is, whether the shake due to the opponent's attack is valid or not. The attack flag 72$n$ is composed of a one-bit register. When the attack flag 72$n$ is turned on, a data value "1" is set to the register. When the attack flag 72$n$ is turned off, a data value "0" is set to the register.

Figure 16:
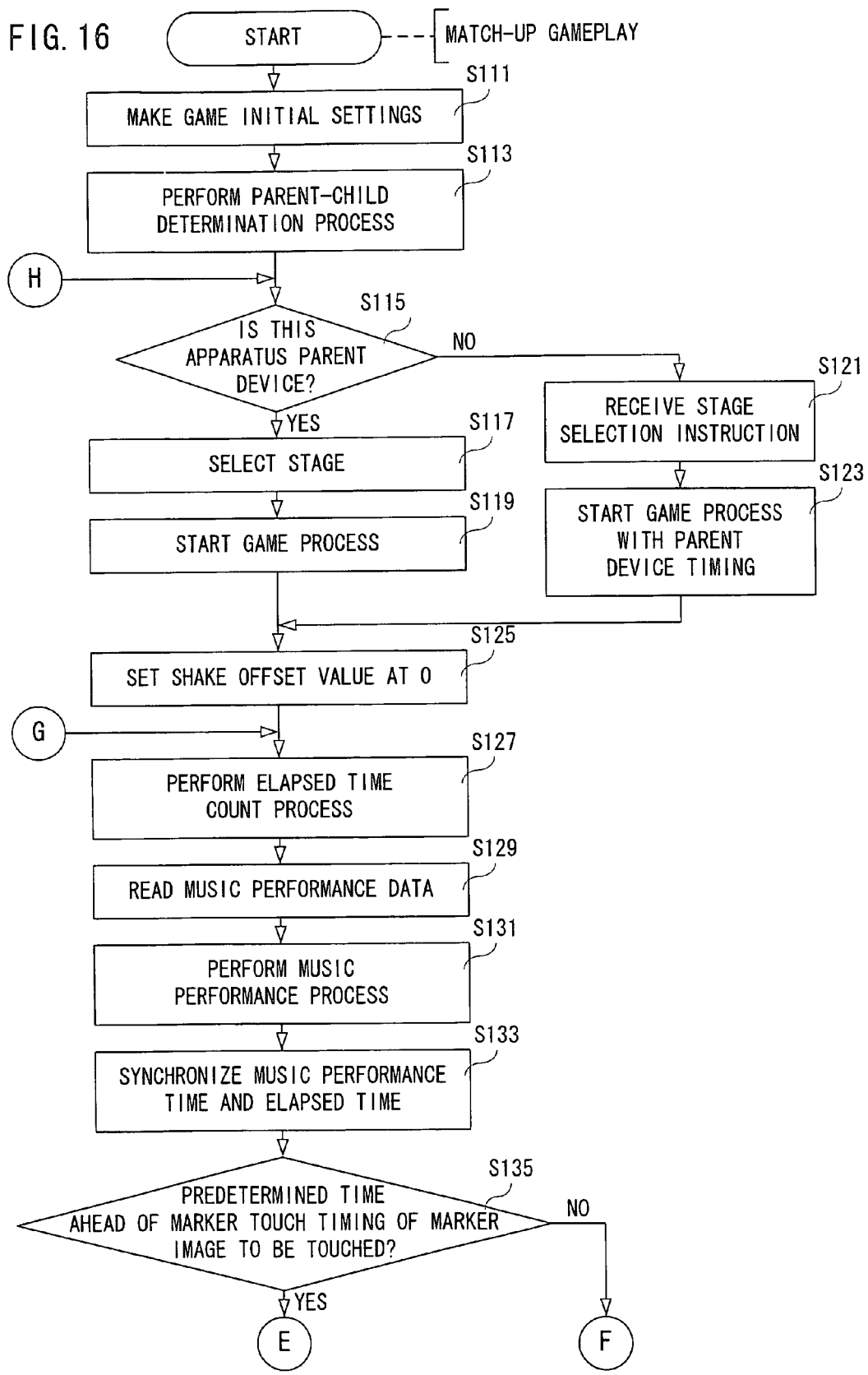
FIG. 16 is a flowchart showing a part of game entire process (match-up gameplay) of the CPU core shown in FIG. 2.
Figure 17:
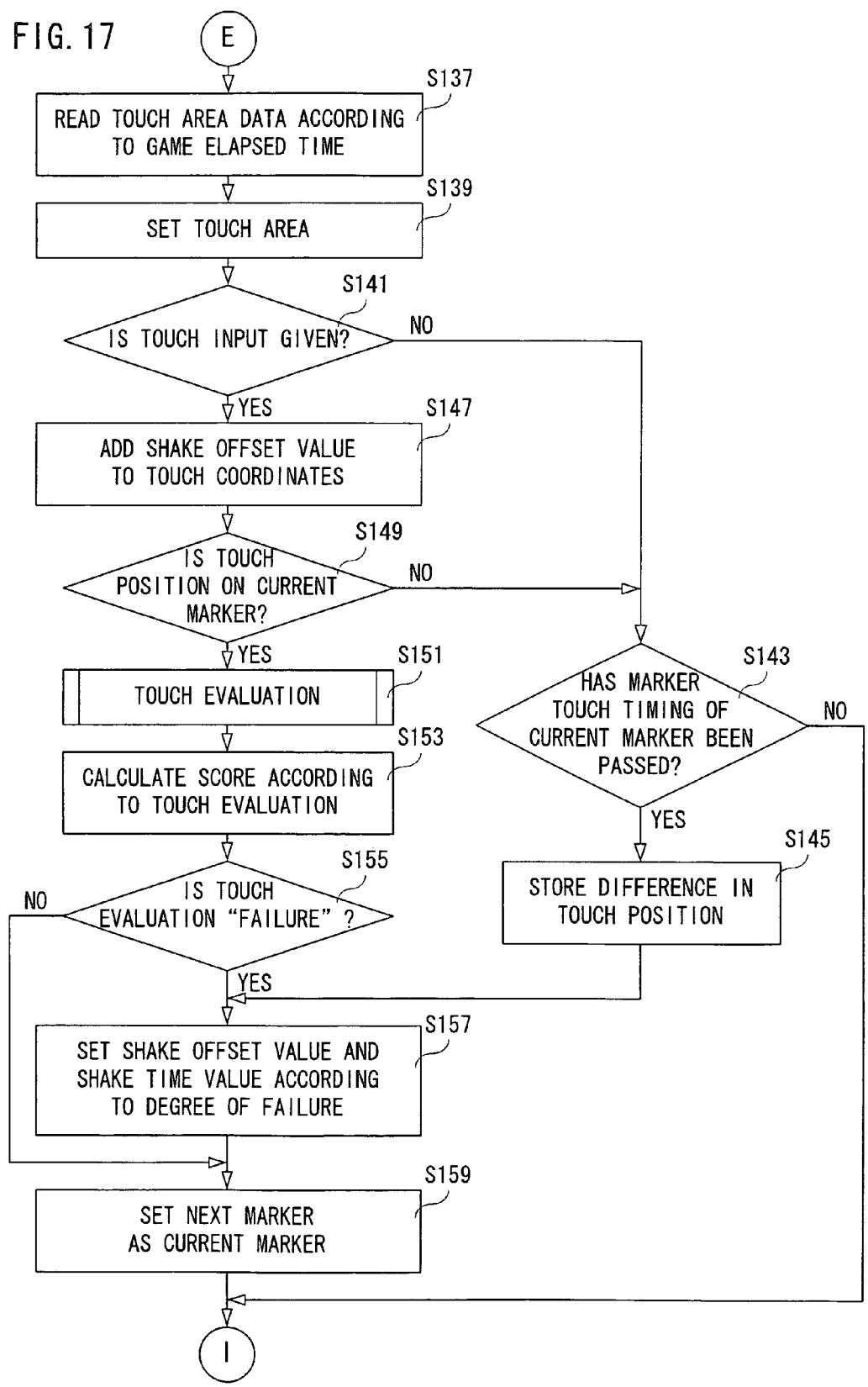
FIG. 17 is a flowchart showing another part of game entire process (match-up gameplay) of the CPU core shown in FIG. 2 and continued from FIG. 16.
Figure 18:
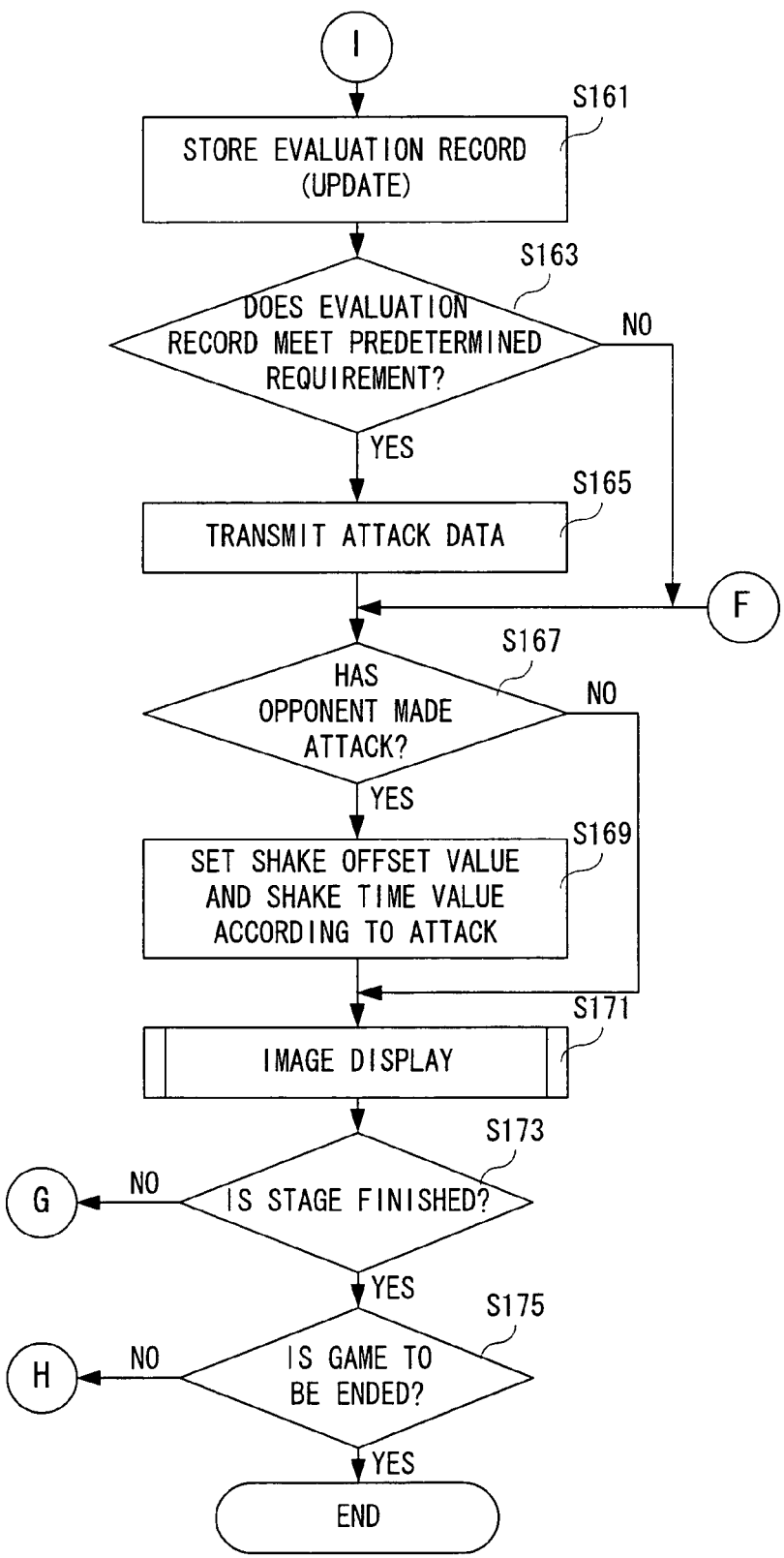
FIG. 18 is a flowchart showing another part of game entire process (match-up gameplay) of the CPU core shown in FIG. 2 and continued from FIG. 16 and FIG. 17.

More specifically, the CPU core 42 executes a game entire process according to the flowchart shown in FIG. 16 to FIG. 18. Besides, the game entire process shown in FIG. 16 to FIG. 18 is a process for the case where match-up gameplay is selected. The game entire process shown in FIG. 16 to FIG. 18 includes the same processes as those of the game entire process shown in FIG. 7 to FIG. 9 (one-player gameplay), and thus the identical processes will be described in brief.

Referring to FIG. 16, when starting the game entire process, the CPU core 42 executes game initial settings in a step S11. In a next step S113, a parent-child determination process is carried out. In this embodiment, as stated above, the selection screen for parent device is displayed so that he/she can select in the selection screen his/her own apparatus as parent device.

In succeeding step S115, it is determined whether this apparatus is the parent device or not. If "YES" in the step S115, that is, if this apparatus is the parent device, the stage is selected in a step S117, and the game process is started in a step S119, and then the process goes to a step S125. Besides, information on the selected stage is transmitted to the child devices, and information on the timing to start the game process is transmitted to the child devices. On the other hand, if "NO" in the step S115, that is, if this apparatus is a child device, a stage selection instruction is received in a step S121, the game process is started with the timing of the parent device, and the process goes to the step S125.

In the step S125, the shake offset value is set at 0. At that time, the touch failure flag 72$k$ and the attack flag 72$n$ are turned off. The elapsed time count process is carried out in a succeeding step S127, and the music performance data is read in a step S129. Subsequently, the music performance process is carried out in a step S131, and the music performance time and the game elapsed time are synchronized in a step S133. Then, it is determined in a step S135 whether now is a predetermined time (e.g. 60 frames) ahead of the marker touch timing of the marker image 102 to be touched. If "NO" in the step S135, the process moves directly to a step S167 shown in FIG. 18. However, if "YES" in the step S135, the touch area data according to the shake elapsed time is read in a step S137 shown in FIG. 17, and the touch area 106 is set in a step S139.

In a next step S141, it is determined whether a touch input was given or not. If "NO" in the step S141, it is determined in a step S143 whether the marker touch timing of the current marker image 102 has been passed or not. If "NO" in the step S143, the process moves directly to a step S161 shown in FIG. 18. However, if "YES" in the step S143, it is concluded that the touch is evaluated as "failure", the difference in touch position is stored in a step S145, and then the process moves directly to a step S157. Besides, if "NO" in the step S141, the process of step S145 is not executed because no touch input was given, and the process goes directly to the step S157. Therefore, in this case, none of a difference in touch timing and a difference in touch position is detected.

In addition, if "YES" in the step S141, the shake offset value is added to the touch coordinates in a step S147. More precisely, a moving distance on the two-dimensional screen (LCD 14) corresponding to the shake offset value for viewpoint movement is added to the touch coordinates. Besides, since the game screen 100 (the marker image 102) may shake due to the opponent's attack in match-up gameplay as descried above, it is here determined whether the shake arose from the touch failure or from the opponent's attack, and the shake offset value is added according to result of the determination. More specifically, it is determined which flag is turned on, the touch failure flag 72k or the attack flag 72n. Then, if the touch failure flag 72k is turned on, the offset value is added to the Y coordinate (in the vertical direction) of the touch coordinates as described above. On the other hand, if the attack flag 72n is turned on, the offset value is added to the X coordinate (in the lateral direction) of the touch coordinates. In addition, if both the touch failure flag 72k and the attack flag 72n are turned on, the attack flag 72n is given priority so as to take advantage of the characteristics of match-up game play. However, in some instances, a game can be played with higher priority given to the touch failure flag 72k.

Subsequently, it is determined in a step S149 whether the touch position is on the current marker image 102 or not. If "NO" in the step S1149, the process moves to a step S143. However, if "YES" in the step S149, the touch evaluation process is carried out in a step S151. The touch evaluation process is the same as described with use of FIG. 10, and thus a duplicate description is omitted here. Next, in a step S153, a score is calculated according to the touch evaluation. Then, it is determined in a step S155 whether the touch evaluation is "failure" or not.

If "NO" in the step S155, the process moves directly to a step S159. If "YES" in the step S155, the shake offset value and the shake time value according to the failure are calculated (set) by equation 1 in the step S157, and then the process goes directly to the step S159. In the step S159, the marker image 102 to be touched next is set as the current marker image 102, and then the process goes to the step S161 shown in FIG. 18.

As shown in FIG. 18, the evaluation record is stored (updated) in the step S161. Here, the touch evaluation, "success" or "failure", is stored. In the case of touch evaluation of "success", both a difference in touch timing and a difference in touch position are stored. In the case of touch evaluation of "failure", either a difference in touch timing or a difference in touch position is stored. If the touch evaluation is concluded as "failure" because no touch is given, none of difference in touch timing and difference in touch position is stored.

In a succeeding step S163, it is determined whether the evaluation record meets a predetermined requirement. The predetermined requirement in this embodiment is that the evaluation of "success" is consecutively achieved predetermined times or more. However, the requirement is not limited to this, and may be set in consideration of difference in touch timing and difference in touch position because these differences are included in the stored evaluation record. This can be arbitrarily set by the game programmer or developer.

If "NO" in the step S163, that is, if the evaluation record does not meet the predetermined requirement, the process moves directly to the step S167. However, if "YES" in the step S163, that is, if the evaluation record meets the predetermined requirement, the attack data is transmitted to all the other game apparatuses 10 in a step S165, and then the process proceeds to the step S167.

It is determined in the step S167 whether the opponent (the other game apparatus 10) has made an attack or not. That is, it is determined whether or not the attack data is received from the other game apparatus 10. If "NO" in the step S167, that is, if the opponent has made no attack, the process goes directly to a step S171. However, if "YES" in the step S167, that is if the opponent has made an attack, the shake offset value and the shake time value are set according to the attack (the attack data) in a step S169, and then the process moves to the step S171. Although not illustrated, the attack flag 72n is turned on in the step S169.

In the step S171, the image display process is carried out. Since the image display process is the same as described with reference to the flowchart shown in FIG. 11, a duplicate description on this process is omitted here. However, the manner of adding the offset value varies depending on whether the touch failure flag 72k is turned on or the attack flag 72n is turned on. That is, the direction of vibration (shake) varies. To be more specific, if the attack flag 72n is turned on, the shake offset value is added to the X coordinates of original viewpoint positions at the time of screen generations. If both the touch failure flag 72k and the attack flag 72n are turned on, the attack flag 72n is given higher priority as described above.

In a succeeding step S173, it is determined whether the stage is finished or not. If "NO" in the step S173, the process returns to the step S127 shown in FIG. 16. Although not illustrated, the touch failure flag 72k and the attack flag 72n are turned off at that time. On the other hand, if "YES" in the step S173, it is determined in a step S175 whether the game is to be ended or not. If "NO" in the step S175, the process returns to the step S115 shown in FIG. 16. On the other hand, if "YES" in the step S1175, the game entire process is terminated.

In the second embodiment as well, it is determined whether the touch is successful or not through detection of not only the touch timing and but also the touch position in relation to the player's touch operation. This allows the player to enjoy the game with a new sense of game operations. Additionally, this game is of a higher difficulty level as compared with other games in which timing is merely set, which would avoid the player from losing interest in playing the game as much as possible.

Additionally, in the above described embodiments, the game screen shakes if the touch is failed or the player suffers the opponent's attack. The consequence of touch failure or the opponent's attack is not limited to this. For example, the number displayed in the marker image may be erased or reversed for a certain time, the size of the marker image may be made smaller or larger, or the shape of the marker image may be changed. Alternatively, the music being reproduced (performed) may be muted or the timer circle image may be deleted (erased) for a certain time. These may be carried out instead of the above described change of the marker image (game screen), or may be carried out with a change in the marker image (game screen).

Additionally, in the above described embodiments, the shake offset value and the shake time value are set on the basis of degree of failure, i.e., a difference in touch timing and a difference in touch position, in making the game screen shake due to the player's own touch failure. Alternatively, in the case of a touch failure, the predetermined shake offset value and the predetermined shake time value may be set regardless of the degree of failure. In this case, the touch failure alone is detected (determined) according to the touch timing difference and the touch position difference. More specifically, the step S27 of FIG. 8 and the step S145 of FIG. 17 are deleted, and the touch evaluation result is just decided as "failure" without having to record the difference in touch timing in the step S55 of FIG. 10. Besides, the predetermined shake offset value and the predetermined shake time value may be stored in advance in the RAM 48.

Moreover, the above described embodiments are intended for the case in which the system is composed of a game apparatus with a display integrally formed. These embodiments are also applicable to the case in which the system are composed of a game apparatus equipped with a separate display, provided that the display is capable of being touched.

Furthermore, in the above embodiments, the game apparatuses are connected to each other in a wireless manner for match-up game play. The manner of connecting the game apparatuses is not limited to this, and the game apparatuses may be connected through the wire or may be connected via the Internet network etc.

In addition, the structure of the game apparatus shall not be limited to the above described ones. For example, the game apparatus may have only one LCD or the touch panel may be provided on each of the two LCDs. Also, two speakers may be provided on the right and left.

Although the example embodiment presented herein has been described and illustrated in detail, it is clearly understood that the same is by way of illustration and example only and is not to be taken by way of limitation, the spirit and scope of the example embodiment being limited only by the terms of the appended claims.

What is claimed is:

1. A non-transitory storage medium storing a game program for a game apparatus comprising a display unit and a touch panel provided on a top surface of the display unit, wherein
said game program allows a processor of said game apparatus to execute:
touch input detection for detecting a touch input to the touch panel;
touch timing control for processing a first timing with which the touch input is to be performed;
touch image display for generating a touch image to be touched by a player on the touch panel and displaying the touch image on said display unit;
touch timing detection for detecting a second timing for the touch input detected in said touch input detection;
timing coincidence degree detection for detecting a degree of coincidence of said first timing and said second timing;
touch position detection for detecting whether or not a touch position indicated by said touch input represents a position to touch; and
touch evaluation for evaluating the touch input according to result of detection in said timing coincidence degree detection and result of detection in said touch position detection, wherein
said touch image display includes first timing display for displaying said first timing visibly as an image overlapping said touch image during the whole time period said touch image is displayed on the display unit.

2. The non-transitory storage medium storing a game program according to claim 1, wherein said position to touch includes a position set in said touch panel in relation to said touch image.

3. The non-transitory storage medium storing a game program according to claim 1, wherein
said game program further allows execution of touch image display change for changing display of said touch image, at least according to evaluation in said touch evaluation.

4. The non-transitory storage medium storing a game program according to claim 3, wherein
in said touch image display change, a display position of said touch image is changed.

5. The non-transitory storage medium storing a game program according to claim 3, wherein
in said touch image display change, a size of said touch image is changed.

6. The non-transitory storage medium storing a game program according to claim 3, wherein
said game program further allows execution of communication for carrying out data communications with another game apparatus, and
in said communication, when a match-up game is played with a player of said other game apparatus, attack data according to evaluation in said touch evaluation is transmitted to the other game apparatus.

7. The non-transitory storage medium storing a game program according to claim 6, wherein
in said touch image display change, when said attack data is received from another game apparatus in said communication, display of said touch image is changed.

8. The non-transitory storage medium storing a game program according to claim 3, wherein
in said touch image display, said touch image is generated on the basis of three-dimensional graphics techniques including a three-dimensional graphics rendering process and a viewpoint conversion process to two-dimensional image, and
in said touch image display change, a viewpoint position in said viewpoint conversion process is changed, at least according to evaluation in said touch evaluation.

9. The non-transitory storage medium storing a game program according to claim 3, wherein
said game program further allows execution of change time period setting for setting a time period during when display of said touch image is changed, and
in said touch image display change, display of said touch image is changed for the time period set in said change time period setting.

10. The non-transitory storage medium storing a game program according to claim 1, wherein
said game program further allows execution of music performance for performing music, and
in said touch timing control, said first timing is controlled in synchronization with rhythm of the music performed in said music performance.

11. A non-transitory storage medium storing a game program for playing a match-up game with connection of two or more game apparatuses comprising a display unit, a touch panel provided on a top surface of the display unit, and a communication network, wherein
said game program allows a processor of each of said game apparatuses to execute:
touch input detection for detecting a touch input to the touch panel;
touch timing control for processing a first timing with which the touch input is to be performed;
touch image display for generating a touch image to be touched by a player on the touch panel and displaying the touch image on said display unit;
touch timing detection for detecting a second timing for the touch input detected in said touch input detection;
timing coincidence degree detection for detecting a degree of coincidence of said first timing and said second timing;

touch position detection for detecting whether or not a touch position indicated by said touch input represents a position to touch;

touch evaluation for evaluating the touch input according to result of detection in said timing coincidence degree detection and result of detection in said touch position detection;

attack data transmission for transmitting attack data to said another game apparatus via said communication network according to evaluation in said touch evaluation; and attack data reception for receiving attack data from said another game apparatus via said communication network, wherein in said touch evaluation, when attack data is received in said attack data reception, the touch input is evaluated with the attack data taken into consideration, wherein said touch image display includes first timing display for displaying said first timing visibly as an image overlapping said touch image during the whole time period said touch image is displayed on the display unit.

12. The non-transitory storage medium storing a game program according to claim 11, wherein
said position to touch includes a position set in said touch panel in relation to said touch image.

13. The non-transitory storage medium storing a game program according to claim 11, wherein
said game program further allows execution of touch image display change for changing display of said touch image when attack data is received in said attack data reception.

14. The non-transitory storage medium storing game program according to claim 13, wherein
in said touch image display change, a display position of said touch image is changed.

15. The non-transitory storage medium storing a game program according to claim 13, wherein in said touch image display change, a size of said touch image is changed.

16. The non-transitory storage medium storing a game program according to claim 13, wherein
in said touch image display, said touch image is generated on the basis of three-dimensional graphics techniques including a three-dimensional graphics rendering process and a viewpoint conversion process to two-dimensional image, and
in said touch image display change, a viewpoint position in said viewpoint conversion process is changed on the basis of said attack data.

17. The non-transitory storage medium storing a game program according to claim 13, wherein
said game program further allows execution of change time period setting for setting a time period during when display of said touch image is changed, and
in said touch image display change, display of said touch image is changed for the time period set in said change time period setting.

18. The non-transitory storage medium storing a game program according to claim 11, wherein said game program further allows execution of music performance for performing music, and
in said touch timing control, said first timing is controlled in synchronization with rhythm of the music performed in said music performance.

19. A game apparatus comprising a display unit and a touch panel provided on a top surface of the display unit, and a processing system, including a computer processor, the computer processor configured to perform:
touch input detection for detecting a touch input to the touch panel;

touch timing control for processing a first timing with which the touch input is to be performed;

touch image display for generating a touch image to be touched by a player on the touch panel and displaying the touch image on said display unit;

touch timing detection for detecting a second timing for the touch input detected by said touch input detection;

timing coincidence degree detection for detecting a degree of coincidence of said first timing and said second timing;

touch position detection for detecting whether or not a touch position indicated by said touch input represents a position to touch; and touch evaluation for evaluating the touch input according to result of detection in said timing coincidence degree detection and result of detection by said touch position detection, wherein said touch image display includes a first timing display for displaying said first timing visibly as an image overlapping said touch image during the whole time period said touch image is displayed on the display unit.

20. The game apparatus according to claim 19, wherein
said position to touch includes a position set in said touch panel in relation to said touch image.

21. A game apparatus comprising a display unit and a touch panel provided on a top surface of the display unit, a processing system, including a computer processor, and a communication network for playing a match-up game with connection of at least one of the other game apparatuses, the computer processor configured to perform:
touch input detection for detecting a touch input to the touch panel;

touch timing control for processing a first timing with which the touch input is to be performed;

touch image display for generating a touch image to be touched by a player on the touch panel and displaying the touch image on said display unit;

touch timing detection for detecting a second timing for the touch input detected by said touch input detection programmed logic circuitry;

timing coincidence degree detection for detecting a degree of coincidence of said first timing and said second timing;

touch position detection for detecting whether or not a touch position indicated by said touch input represents a position to touch;

touch evaluation for evaluating the touch input according to result of detection in said timing coincidence degree detection and result of detection by said touch position detection, wherein said touch image display includes a first timing display for displaying said first timing visibly as an image overlapping said touch image during the whole time period said touch image is displayed on the display unit; the computer processor further configured to perform:

attack data transmission for transmitting attack data to said another game apparatus via said communication network according to evaluation by said touch evaluation; and attack data reception for receiving attack data from said another game apparatus via said communication network, wherein said touch evaluation, when attack data is received by said attack data reception, evaluates the touch input with the attack data taken into consideration.

22. A game control method for a game apparatus comprising a display unit and a touch panel provided on a top surface of the display unit, including the following:
- detecting a touch input to the touch panel;
- processing a first timing with which the touch input is to be performed;
- generating a touch image to be touched by a player on the touch panel and displaying the touch image on said display unit;
- detecting a second timing for the touch input detected in said detecting a touch input to the touch panel;
- detecting a degree of coincidence of said first timing and said second timing;
- detecting whether or not a touch position indicated by said touch input represents a position to touch; and
- evaluating the touch input according to result of detection in said detecting a degree of coincidence and result of detection in said detecting whether or not a touch position indicated by said touch input represents a position to touch, wherein
- said generating a touch image includes displaying said first timing visibly as an image overlapping said touch image during the whole time period said touch image is displayed on the display unit.

23. A non-transitory storage medium storing a game program for a game apparatus comprising a display unit and a touch panel provided in relation to the display unit, said game program allowing a processor of said game apparatus to execute following:
- touch input detection for detecting position data of a touched position by a touch input to said touch panel;
- touch image display for generating a touch image to be touched by a player and displaying the touch image on said display unit;
- touch position setting for setting a position to be touched on said touch panel in relation to the touch image;
- timing image display for displaying a timing image on said display unit, and varying the timing image repeatedly;
- first timing detection for detecting first timing data indicative of a first timing that a timing that the timing image becomes to have a predetermined relationship with the touch image is a timing with which a touch to the touch image is to be performed;
- second timing detection for detecting second timing data indicative of a second timing that is a timing that the position data is detected in said touch input detection;
- timing determination for determining whether or not the first timing data and the second timing data are coincident with each other;
- position determination for determining whether or not the touched position designates the position to be touched based on the position data detected in said touch input detection and position data of the position to be touched set in said touch position setting; and
- evaluation for evaluating the touch input according to a determination result in said timing determination and a determination result in said position determination.

24. A game apparatus, comprising:
- a display unit;
- a touch panel provided in relation to said display unit;
- a processing system, including a computer processor, the computer processor being configured to perform:
  - touch input detecting for detecting position data of a touched position by a touch input to said touch panel;
  - touch image displaying for generating a touch image to be touched by a player and displaying the touch image on said display unit;
  - touch position setting for setting a position to be touched on said touch panel in relation to the touch image;
  - timing image displaying for displaying a timing image on said display unit, and varying the timing image repeatedly;
  - first timing detecting for detecting first timing data indicative of a first timing that a timing that the timing image becomes to have a predetermined relationship with the touch image is a timing with which a touch to the touch image is to be performed;
  - second timing detecting for detecting second timing data indicative of a second timing that is a timing that the position data is detected in said touch input detection;
  - timing for determining whether or not the first timing data and the second timing data are coincident with each other;
  - position determining for determining whether or not the touched position designates the position to be touched based on the position data detected in said touch input detecting and position data of the position to be touched set in said touch position setting; and
  - evaluating for evaluating the touch input according to a determination result in said timing determination and a determination result in said position determining.

25. The non-transitory storage medium according to claim 23, wherein said first timing is a timing being set in advance.

26. The non-transitory storage medium according to claim 23, wherein
said game program allowing the processor of said game apparatus to further execute music performance for performing a piece of music, wherein said first timing is set according to the music performance.

27. A game system using a display unit and a touch panel provided in relation to the display unit, comprising:
- a touch input detecting portion which detects position data of a touched position by a touch input to said touch panel;
- a touch image displaying portion which displays a touch image to be touched by a player on said display unit;
- a touch position setting portion which sets a position to be touched on said touch panel in relation to the touch image;
- a timing image displaying portion which displays a timing image on said display unit and varies the timing image repeatedly;
- a first timing detecting portion which detects first timing data indicative of a first timing that a timing that the timing image becomes to have a predetermined relationship with the touch image is a timing with which a touch to the touch image is to be performed;
- a second timing detecting portion which detects second timing data indicative of a second timing that is a timing that the position data is detected in said touch input detection;
- a timing determining portion which determines whether or not the first timing data and the second timing data are coincident with each other;
- a position determining portion which determines whether or not the touched position designates the position to be touched based on the position data detected in said touch input detection and position data of the position to be touched set in said touch position setting; and
- an evaluating portion which evaluates the touch input according to a determination result by said timing determining portion and a determination result by said position determining portion.

28. A method of controlling a game in a game system using a display unit and a touch panel provided in relation to the display unit, comprising:
- detecting position data of a touched position by a touch input to said touch panel;
- displaying a touch image to be touched by a player on said display unit;
- setting a position to be touched on said touch panel in relation to the touch image;
- displaying a timing image on said display unit and varying the timing image repeatedly;
- detecting first timing data indicative of a first timing that a timing that the timing image becomes to have a predetermined relationship with the touch image is a timing with which a touch to the touch image is to be performed;
- detecting second timing data indicative of a second timing that is a timing that the position data is detected in said touch input detection;
- determining whether or not the first timing data and the second timing data are coincident with each other;
- determining whether or not the touched position designates the position to be touched based on the position data detected in said touch input detection and position data of the position to be touched set in said touch position setting; and
- evaluating the touch input according to a determination result by the timing determining and a determination result by the position determining.

* * * * *